US012652136B2

(12) United States Patent
Kumar

(10) Patent No.: US 12,652,136 B2
(45) Date of Patent: *Jun. 9, 2026

(54) DYNAMIC ADDITIONAL DEMODULATION REFERENCE SIGNAL CONFIGURATION

(71) Applicant: Dell Products L.P., Round Rock, TX (US)

(72) Inventor: Sunil Kumar, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 526 days.

This patent is subject to a terminal disclaimer.

(21) Appl. No.: 18/063,357

(22) Filed: Dec. 8, 2022

(65) Prior Publication Data

US 2024/0195555 A1 Jun. 13, 2024

(51) Int. Cl.
| | |
|---|---|
| *H04L 5/00* | (2006.01) |
| *H04L 25/02* | (2006.01) |
| *H04L 27/26* | (2006.01) |

(52) U.S. Cl.
CPC .......... *H04L 5/0048* (2013.01); *H04L 5/0046* (2013.01)

(58) Field of Classification Search
CPC ........................... H04L 5/0048; H04L 5/0046
USPC ........................................................ 370/329
See application file for complete search history.

(56) References Cited

U.S. PATENT DOCUMENTS

| | | |
|---|---|---|
| 11,336,419 B2 | 5/2022 | Wang et al. |
| 12,323,356 B2 | 6/2025 | Kumar et al. |

| | | | | |
|---|---|---|---|---|
| 2015/0304080 A1* | 10/2015 | Yi | ......................... | H04L 5/0053 |
| | | | | 370/329 |
| 2016/0127932 A1 | 5/2016 | Cosimini et al. | | |
| 2016/0212737 A1* | 7/2016 | Jang | ...................... | H04L 5/0053 |
| 2018/0270103 A1 | 9/2018 | Chapman et al. | | |

(Continued)

FOREIGN PATENT DOCUMENTS

| | | |
|---|---|---|
| WO | 2018229955 | 12/2018 |
| WO | 2019/032296 | 2/2019 |

(Continued)

OTHER PUBLICATIONS

International Search Report and Written Opinion mailed Apr. 19, 2024 for PCT Application No. PCT/US2023/035945, 17 pages.

(Continued)

*Primary Examiner* — Xuan Lu
(74) *Attorney, Agent, or Firm* — Amin, Turocy & Watson, LLP

(57) ABSTRACT

A system can configure a first number of demodulation reference signal (DMRS) positions in radio resource control information as part of a connection setup with a base station that is configured to facilitate first broadband cellular communications, wherein the first broadband cellular communications are facilitated with carrier aggregation of a primary cell and a secondary cell. The system can, after attaching to the base station, receive a first medium access control control element (MAC-CE) message from the base station indicative of modifying the number of DMRS positions. The system can, after attaching to the base station, receive a second MAC-CE message from the base station indicative of modifying the number of DMRS positions. The system can conduct second broadband cellular communications with the base station according to the modified number of DMRS positions.

20 Claims, 22 Drawing Sheets

(56) References Cited

U.S. PATENT DOCUMENTS

| | | | |
|---|---|---|---|
| 2019/0223176 A1* | 7/2019 | Liu | H04W 72/04 |
| 2019/0349023 A1 | 11/2019 | Ge et al. | |
| 2020/0052802 A1* | 2/2020 | Ryu | H04W 52/242 |
| 2020/0229185 A1 | 7/2020 | Zhang et al. | |
| 2020/0314960 A1 | 10/2020 | Basu Mallick et al. | |
| 2020/0328861 A1 | 10/2020 | Malladi et al. | |
| 2021/0075571 A1 | 3/2021 | Manolakos et al. | |
| 2021/0153171 A1 | 5/2021 | Saito et al. | |
| 2021/0250753 A1 | 8/2021 | Hosseini et al. | |
| 2022/0078872 A1 | 3/2022 | Shrestha et al. | |
| 2022/0123853 A1 | 4/2022 | Chandran et al. | |
| 2022/0159757 A1 | 5/2022 | Balasubramanian et al. | |
| 2022/0166566 A1 | 5/2022 | Kumar et al. | |
| 2022/0286253 A1 | 9/2022 | Chae et al. | |
| 2023/0006762 A1 | 1/2023 | Levitsky et al. | |
| 2023/0139332 A1 | 5/2023 | Dinan | |
| 2023/0164702 A1* | 5/2023 | Lee | H04W 52/32 |
| | | | 455/522 |
| 2023/0216711 A1* | 7/2023 | Yao | H04L 25/0228 |
| | | | 370/328 |
| 2023/0353306 A1 | 11/2023 | Ren et al. | |
| 2023/0371030 A1 | 11/2023 | Wang et al. | |
| 2023/0379926 A1 | 11/2023 | Pardhasarathy et al. | |
| 2023/0379927 A1 | 11/2023 | Agarwal et al. | |
| 2023/0379930 A1 | 11/2023 | Chacko et al. | |
| 2024/0187182 A1* | 6/2024 | Shukla | H04L 5/0055 |

FOREIGN PATENT DOCUMENTS

| | | |
|---|---|---|
| WO | 2021/243481 | 12/2021 |
| WO | WO-2021243481 A1 * | 12/2021 |
| WO | 2022/031919 | 2/2022 |
| WO | 2023/048330 | 3/2023 |

OTHER PUBLICATIONS

Moderator (Huawei): "Summary#I of efficient SCell activation/de-activation mechanism of NR CA", 3GPP Draft; R1-2103886, RAN WG1, No. E-meeting; Apr. 20, 2021, [https://ftp.3gpp.org/tsg_ran/WG1_RL1/TSGR1_104b-e/Inbox/R1-2103886.zip R1-2103886 Summiary#2 of SCell activation of NR CA.docx], 43 pages.

International Search Report and Written Opinion mailed Feb. 13, 2024 for PCT Application No. PCT/US2023/035946, 14 pages.

International Search Report and Written Opinion mailed Feb. 26, 2024 for PCT Application No. PCT/US2023/035950, 19 pages.

International Search Report and Written Opinion mailed Mar. 1, 2024 for PCT Application No. PCT/US2023/036165, 19 pages.

Office Action mailed Aug. 15, 2024 for U.S. Appl. No. 17/812,261, 53 pages.

Office Action mailed Oct. 24, 2024 for U.S. Appl. No. 17/812,265, 46 pages.

Final Office Action mailed Feb. 18, 2025 for U.S. Appl. No. 17/812,261, 50 pages.

Office Action mailed Nov. 19, 2024 for U.S. Appl. No. 17/812,262, 44 pages.

Kumar et al. "Dynamic Additional Demodulation Reference Signal Configuration" U.S. Appl. No. 17/812,261, filed Jul. 13, 2022, 64 pages.

Kumar et al. "Dynamic Additional Demodulation Reference Signal Configuration" U.S. Appl. No. 17/812,271, filed Jul. 13, 2022, 62 pages.

Kumar et al. "Dynamic Additional Demodulation Reference Signal Configuration" U.S. Appl. No. 17/812,265, filed Jul. 13, 2022, 62 pages.

Kumar et al. "Dynamic Additional Demodulation Reference Signal Configuration" U.S. Appl. No. 17/812,262, filed Jul. 13, 2022, 62 pages.

Kumar, Sunil. "Dynamic Additional Demodulation Reference Signal Configuration" U.S. Appl. No. 18/063,347, filed Dec. 8, 2022, 74 pages.

Kumar, Sunil. "Dynamic Additional Demodulation Reference Signal Configuration" U.S. Appl. No. 18/068,261, filed Dec. 19, 2022, 69 pages.

Kumar, Sunil. "Dynamic Additional Demodulation Reference Signal Configuration" U.S. Appl. No. 18/068,737, filed Dec. 20, 2022, 68 pages.

Notice of Allowance mailed May 5, 2025 for U.S. Appl. No. 18/068,737, 40 pages.

Office Action mailed Mar. 24, 2025 for U.S. Appl. No. 18/063,347, 43 pages.

Office Action mailed Apr. 10, 2025 for U.S. Appl. No. 17/812,271, 35 pages.

Notice of Allowance mailed Feb. 26, 2025 for U.S. Appl. No. 17/812,262, 22 pages.

Notification concerning transmittal of International Preliminary Report on Patentability mailed Jun. 19, 2025 for PCT Application No. PCT/US2023/035945, 10 pages.

European Office Action mailed Jul. 15, 2025 for European Patent Application No. 23813121.3, 3 pages.

Notice of Allowance mailed May 13, 2025 for U.S. Appl. No. 17/812,261, 34 pages.

Notice of Allowance mailed Jul. 29, 2025 for U.S. Appl. No. 18/063,347, 24 pages.

Office Action mailed Jul. 9, 2025 for U.S. Appl. No. 18/068,261, 47 pages.

Notification concerning transmittal of International Preliminary Report on Patentability mailed Jul. 3, 2025 for PCT Application No. PCT/US2023/035950, 14 pages.

Notification concerning transmittal of International Preliminary Report on Patentability mailed Jul. 3, 2025 for PCT Application No. PCT/US2023/036165, 14 pages.

European Office Action mailed Jul. 29, 2025 for European Patent Application No. 23813122.1, 3 pages.

European Office Action mailed Jul. 29, 2025 for European Patent Application No. 23813147.8, 3 pages.

Notification concerning transmittal of International Preliminary Report on Patentability mailed Jun. 19, 2025 for PCT Application No. PCT/US2023/035946, 9 pages.

European Office Action mailed Jul. 15, 2025 for European Patent Application No. 2309824.8, 3 pages.

Notice of Allowance mailed Aug. 19, 2025 for U.S. Appl. No. 17/812,271, 37 pages.

Office Action mailed Sep. 24, 2025 for U.S. Appl. No. 17/812,265, 162 pages.

Notice of Allowance mailed Dec. 18, 2025 for U.S. Appl. No. 17/812,265, 365 pages.

Office Action mailed Jan. 27, 2026 for U.S. Appl. No. 18/068,261, 49 pages.

\* cited by examiner

<u>100</u>

```
-- ASN1START
-- TAG-DMRS-DOWNLINKCONFIG-START

DMRS-DownlinkConfig ::=          SEQUENCE {
    dmrs-Type                       ENUMERATED {type2}          OPTIONAL,   -- Need S
    dmrs-AdditionalPosition         ENUMERATED {pos0, pos1, pos3}  OPTIONAL,   -- Need S
    maxLength                       ENUMERATED {len2}           OPTIONAL,   -- Need S
    scramblingID0                   INTEGER (0..65535)          OPTIONAL,   -- Need S
    scramblingID1                   INTEGER (0..65535)          OPTIONAL,   -- Need S
    phaseTrackingRS                 SetupRelease { PTRS-DownlinkConfig } OPTIONAL,   -- Need M
    ...,
    [[
    dmrs-Downlink-r16               ENUMERATED {enabled}        OPTIONAL    -- Need R
    ]]

}

-- TAG-DMRS-DOWNLINKCONFIG-STOP
-- ASN1STOP
```

```
--- ASN1START
--- TAG-DMRS-UPLINKCONFIG-START

DMRS-UplinkConfig ::=                   SEQUENCE {
    dmrs-Type                           ENUMERATED {type2}           OPTIONAL,     --- Need S
    dmrs-AdditionalPosition             ENUMERATED {pos0, pos1, pos3} OPTIONAL,    --- Need S
    phaseTrackingRS                     SetupRelease { PTRS-UplinkConfig } OPTIONAL, -- Need M
    maxLength                           ENUMERATED {len2}            OPTIONAL,     -- Need S
    transformPrecodingDisabled          SEQUENCE {
        scramblingID0                       INTEGER (0..65535)       OPTIONAL,     --- Need S
        scramblingID1                       INTEGER (0..65535)       OPTIONAL,     --- Need S
        ...,
        [[
        dmrs-Uplink-r16                     ENUMERATED {enabled}     OPTIONAL      --- Need R
        ]]
    }                                                                OPTIONAL,     --- Need R

--- TAG-DMRS-UPINKCONFIG-STOP
--- ASN1STOP
```

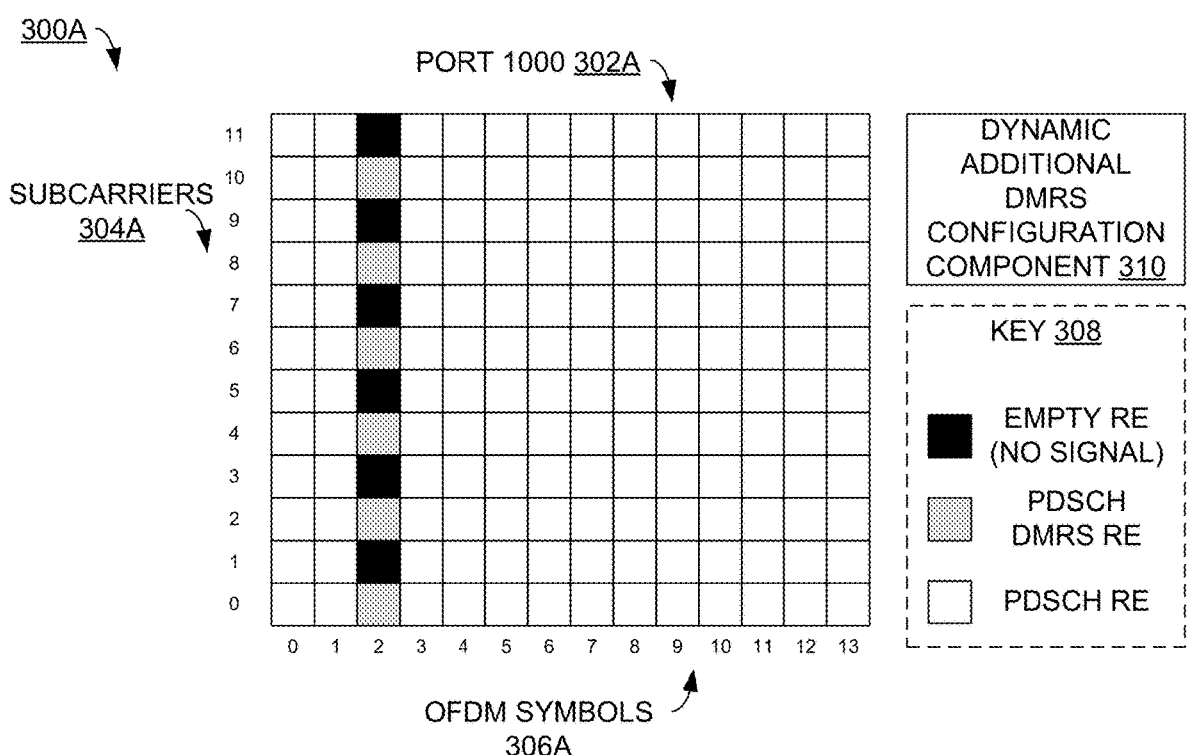
PORT 1000 302A
SUBCARRIERS 304A
OFDM SYMBOLS 306A
DYNAMIC ADDITIONAL DMRS CONFIGURATION COMPONENT 310
KEY 308
EMPTY RE (NO SIGNAL)
PDSCH DMRS RE
PDSCH RE
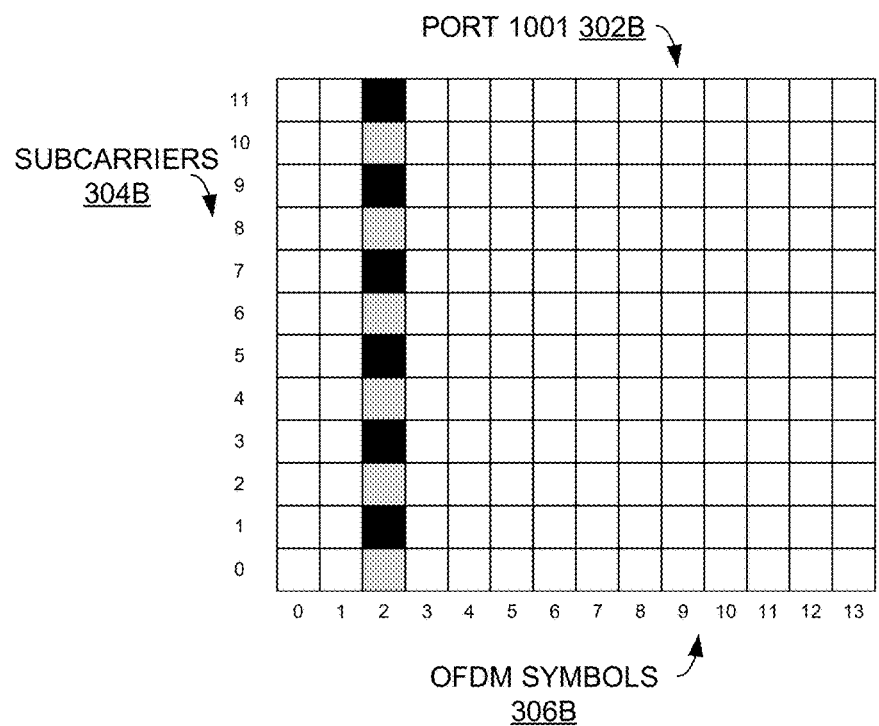
PORT 1001 302B
SUBCARRIERS 304B
OFDM SYMBOLS 306B
FIG. 3A

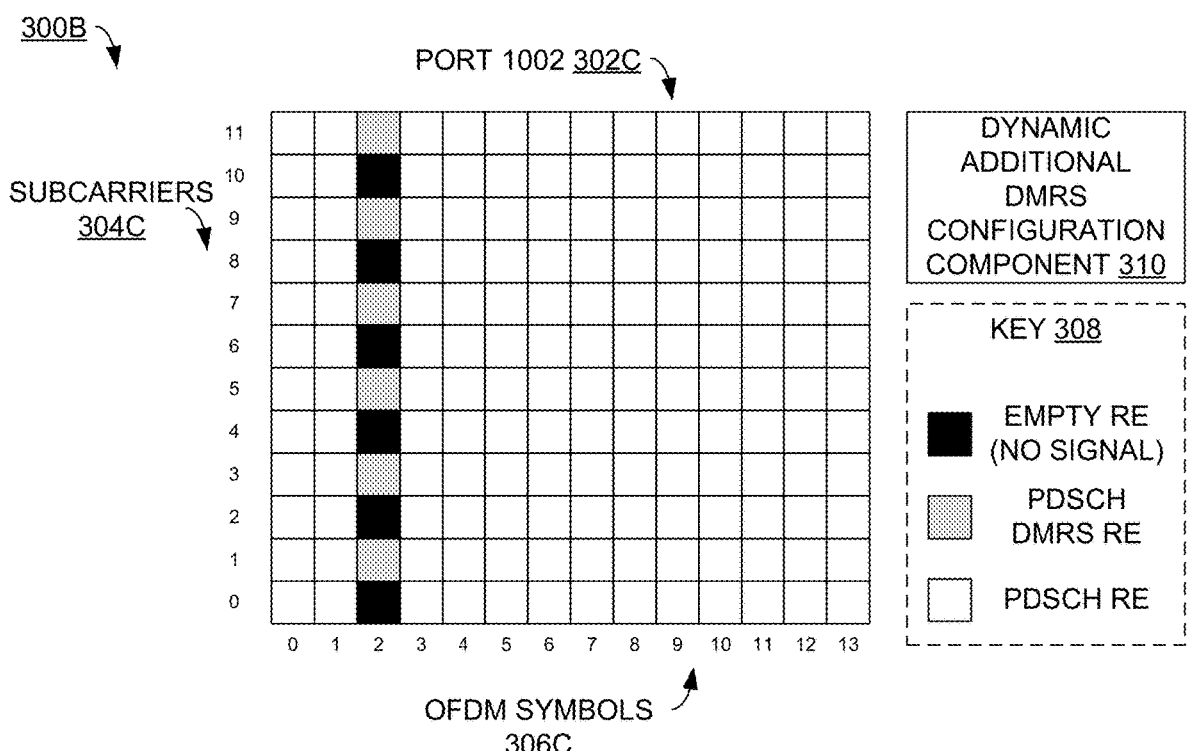
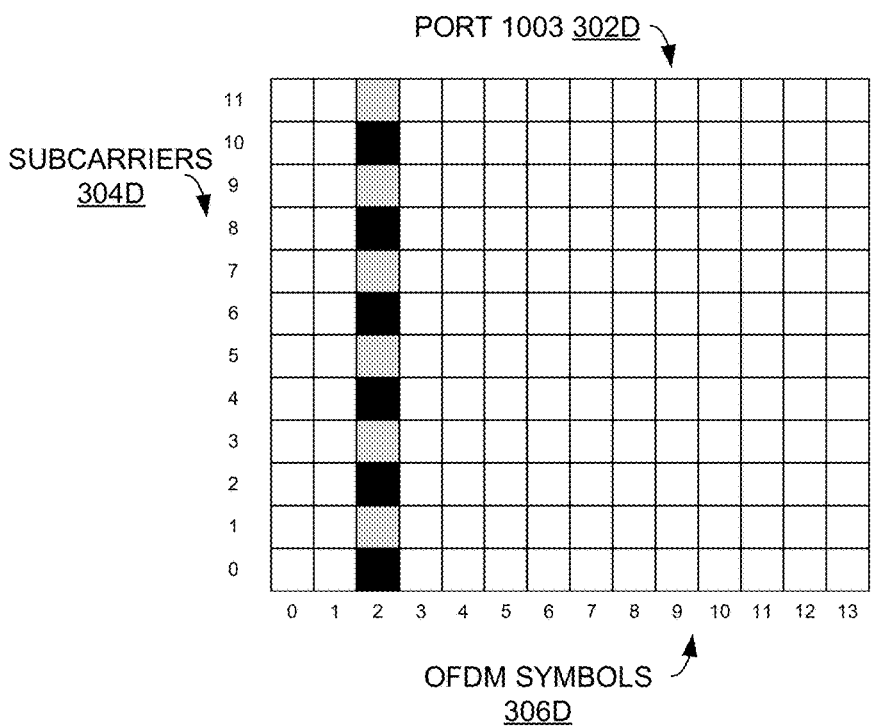
FIG. 3B

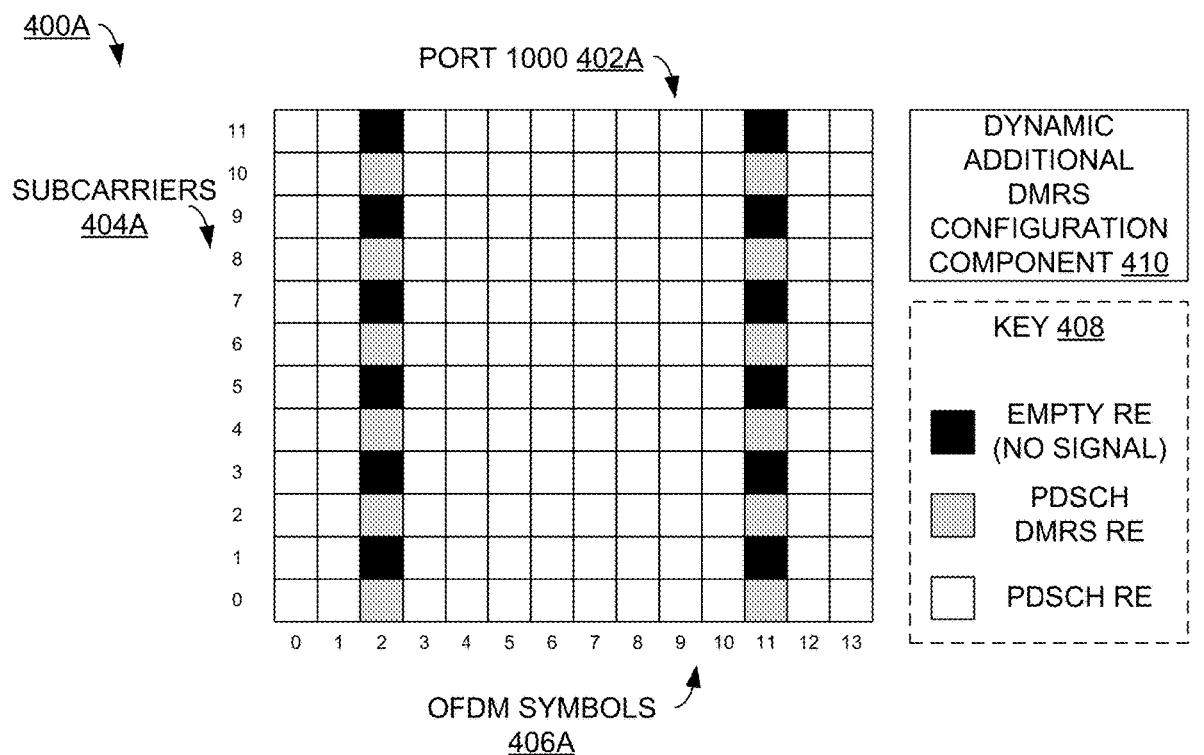
PORT 1000 402A
SUBCARRIERS 404A
DYNAMIC ADDITIONAL DMRS CONFIGURATION COMPONENT 410
KEY 408
EMPTY RE (NO SIGNAL)
PDSCH DMRS RE
PDSCH RE
OFDM SYMBOLS 406A
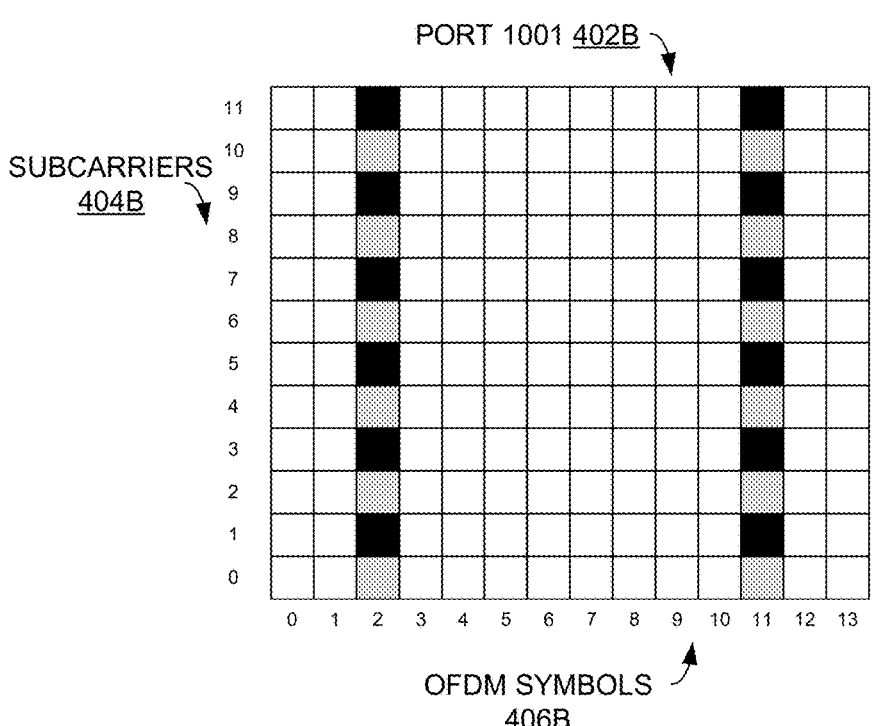
PORT 1001 402B
SUBCARRIERS 404B
OFDM SYMBOLS 406B
FIG. 4A

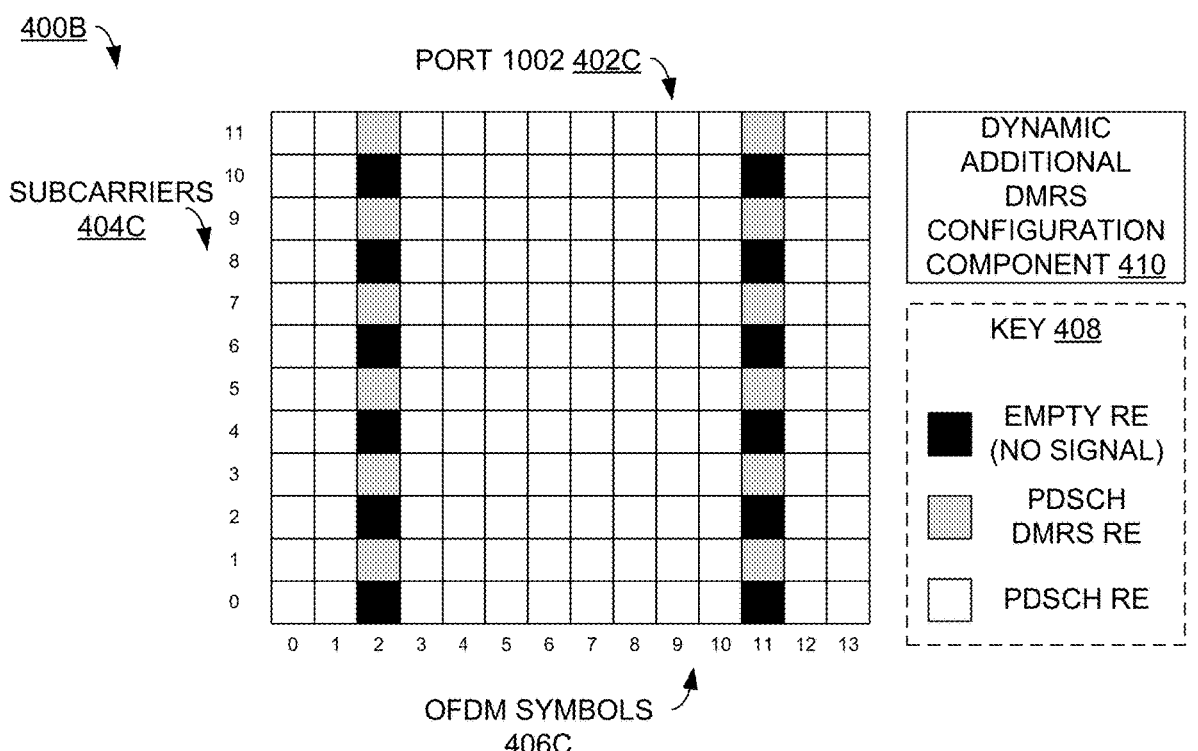
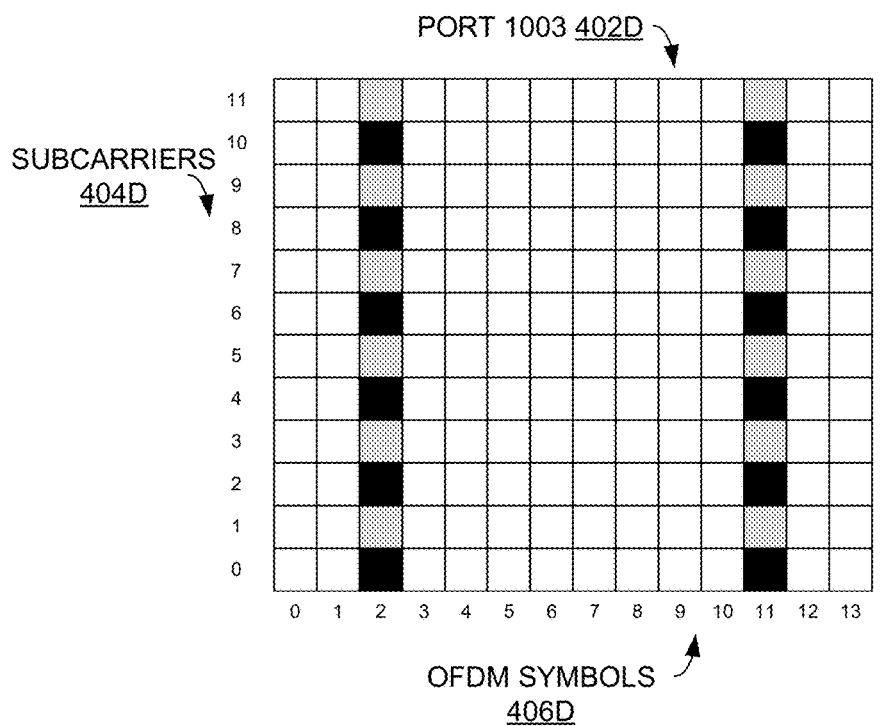
FIG. 4B

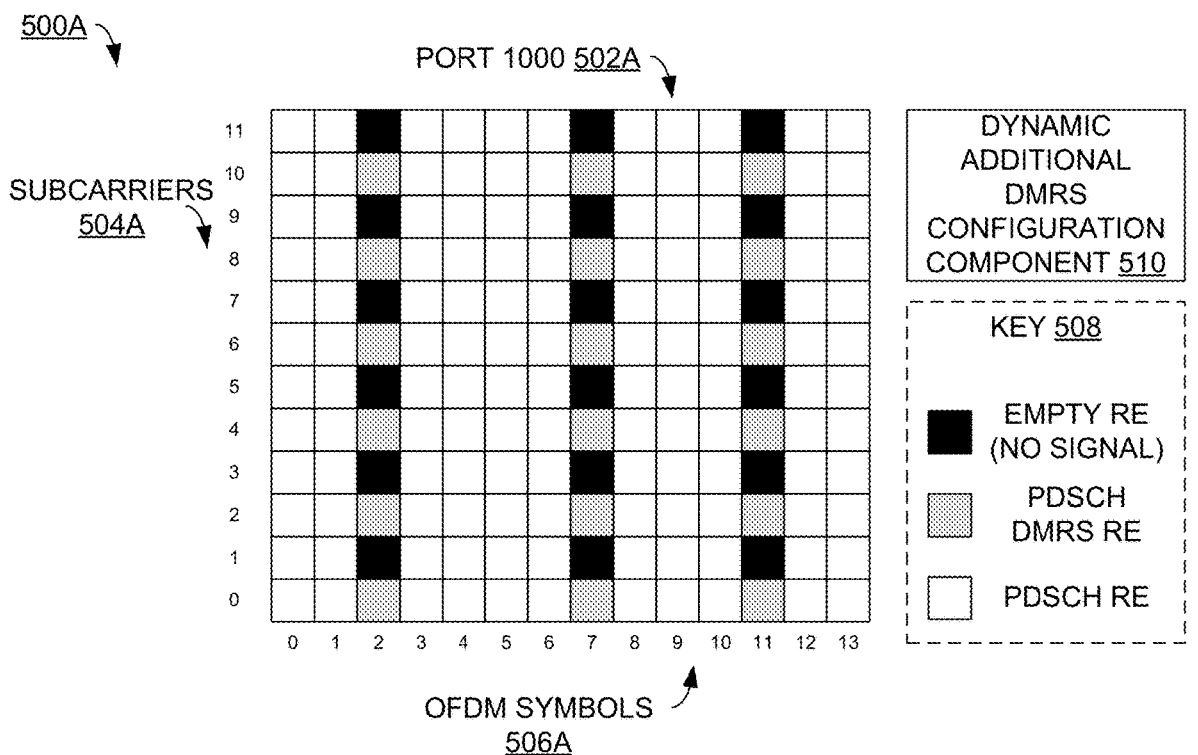
PORT 1000 502A
SUBCARRIERS 504A
OFDM SYMBOLS 506A
DYNAMIC ADDITIONAL DMRS CONFIGURATION COMPONENT 510
KEY 508
■ EMPTY RE (NO SIGNAL)
▦ PDSCH DMRS RE
☐ PDSCH RE
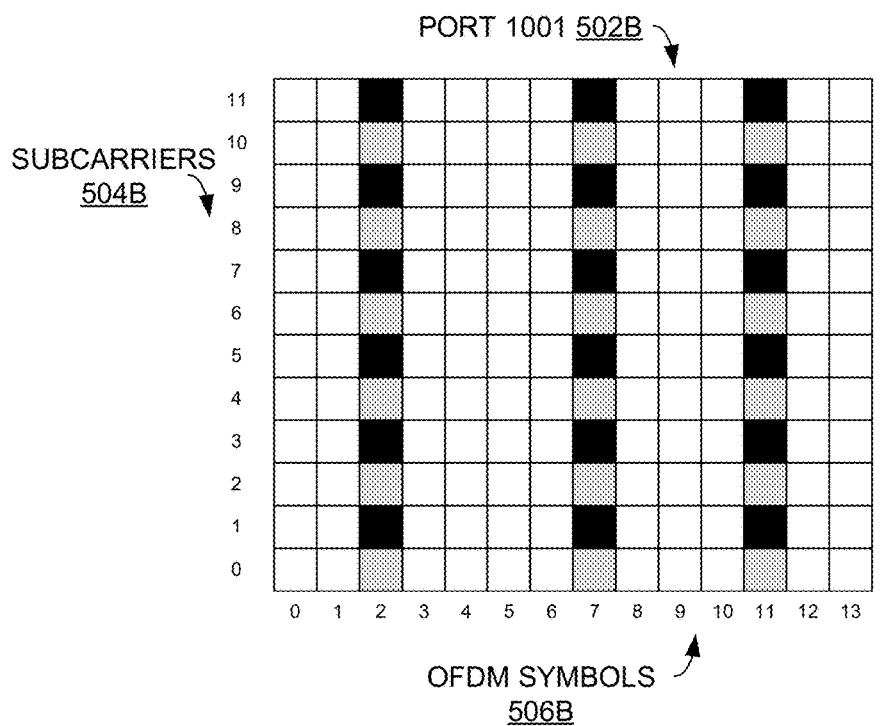
PORT 1001 502B
SUBCARRIERS 504B
OFDM SYMBOLS 506B
FIG. 5A

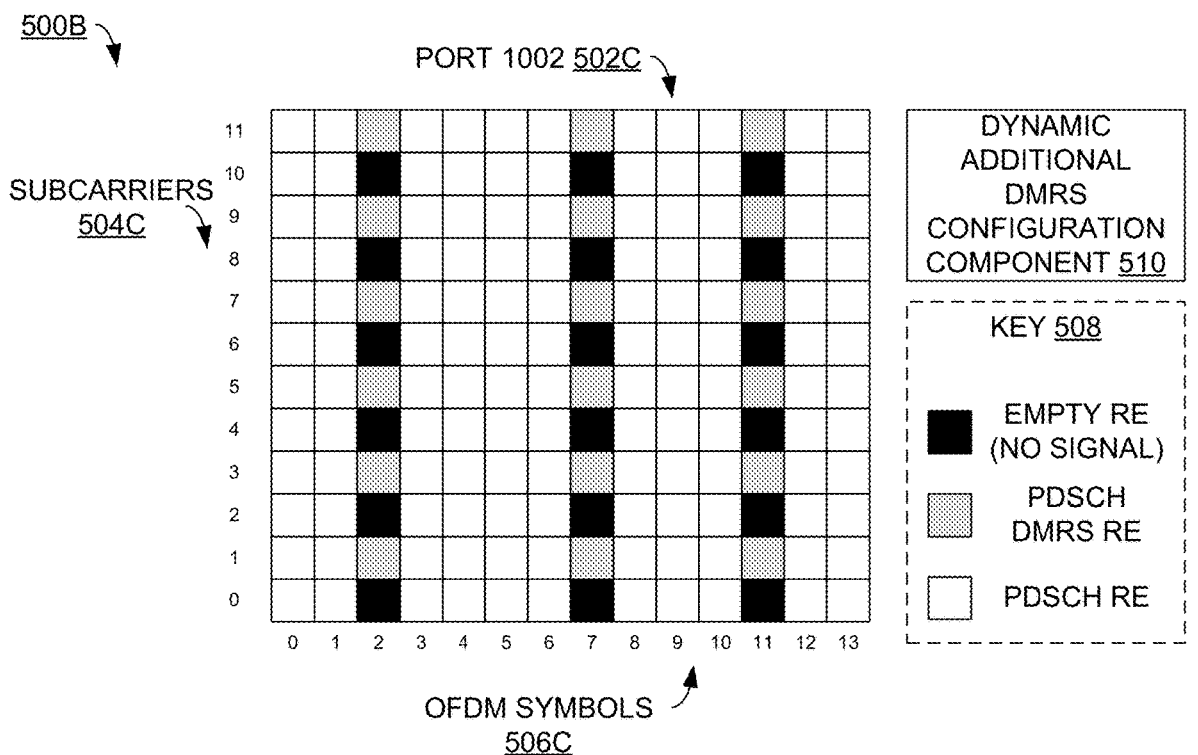
PORT 1002 502C
SUBCARRIERS 504C
OFDM SYMBOLS 506C
DYNAMIC ADDITIONAL DMRS CONFIGURATION COMPONENT 510
KEY 508
EMPTY RE (NO SIGNAL)
PDSCH DMRS RE
PDSCH RE
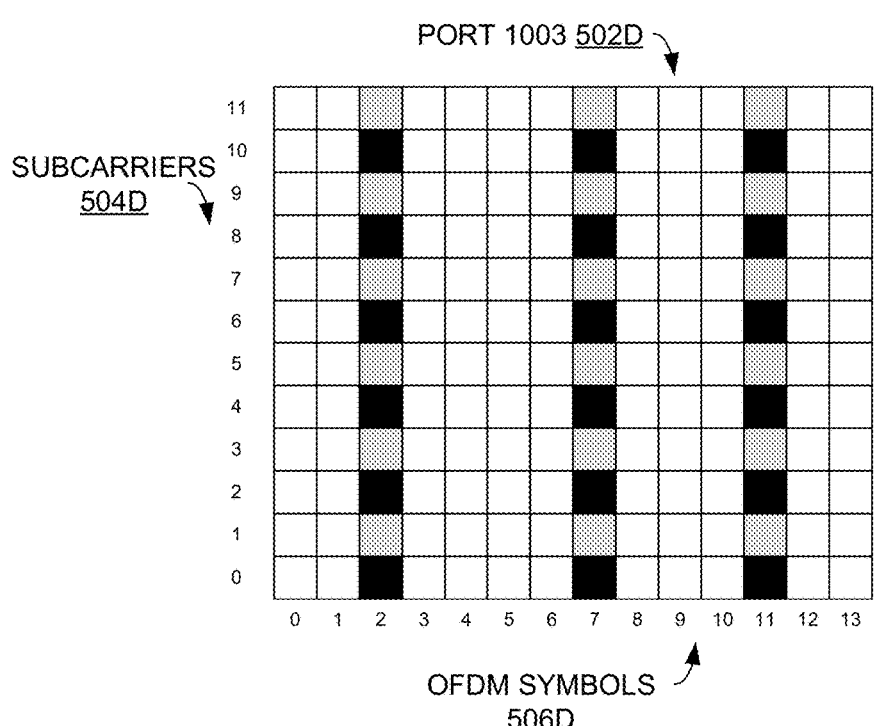
PORT 1003 502D
SUBCARRIERS 504D
OFDM SYMBOLS 506D
FIG. 5B

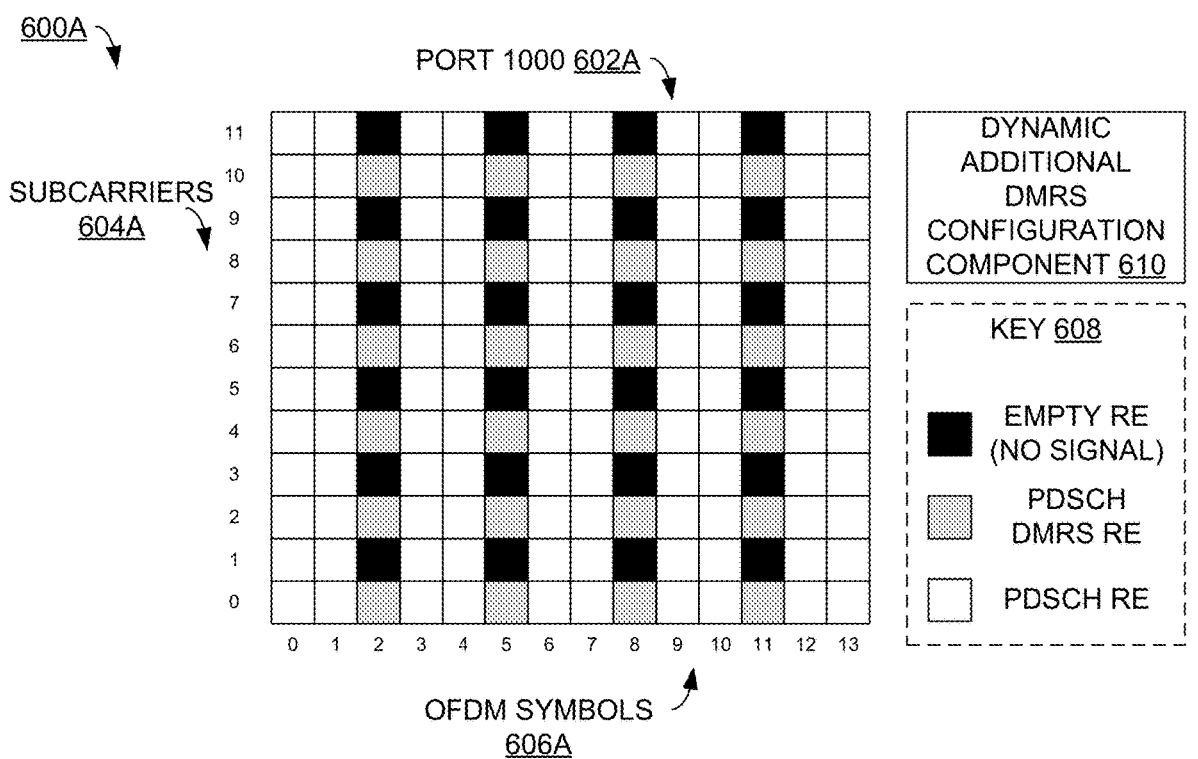
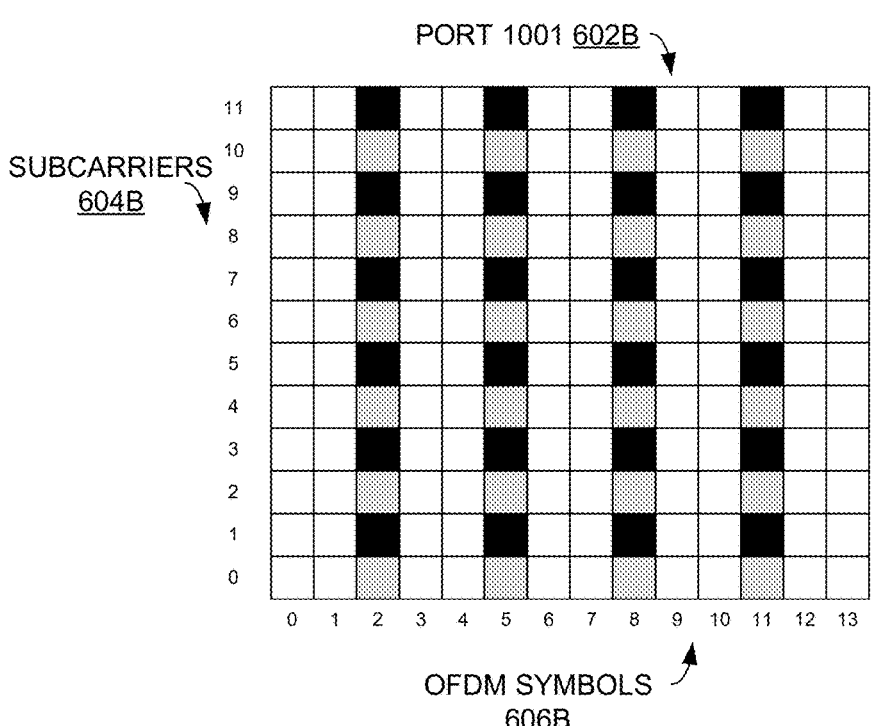
FIG. 6A

600B
PORT 1002 602C
SUBCARRIERS 604C
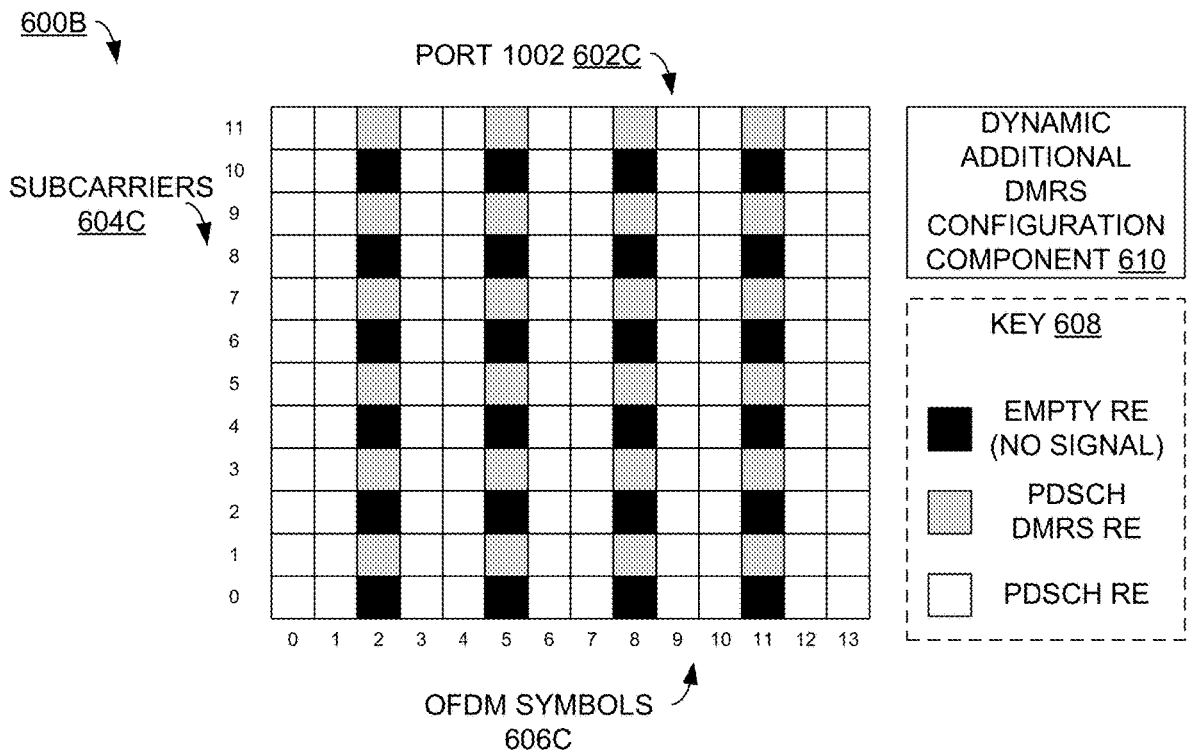
DYNAMIC ADDITIONAL DMRS CONFIGURATION COMPONENT 610
KEY 608
■ EMPTY RE (NO SIGNAL)
▦ PDSCH DMRS RE
□ PDSCH RE
OFDM SYMBOLS 606C
PORT 1003 602D
SUBCARRIERS 604D
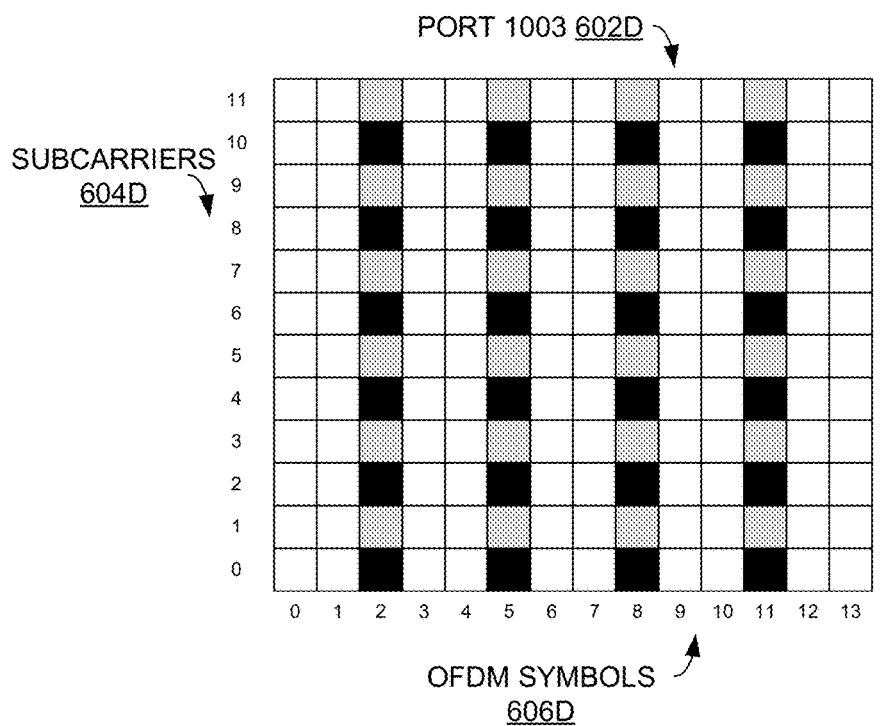
OFDM SYMBOLS 606D
FIG. 6B

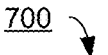
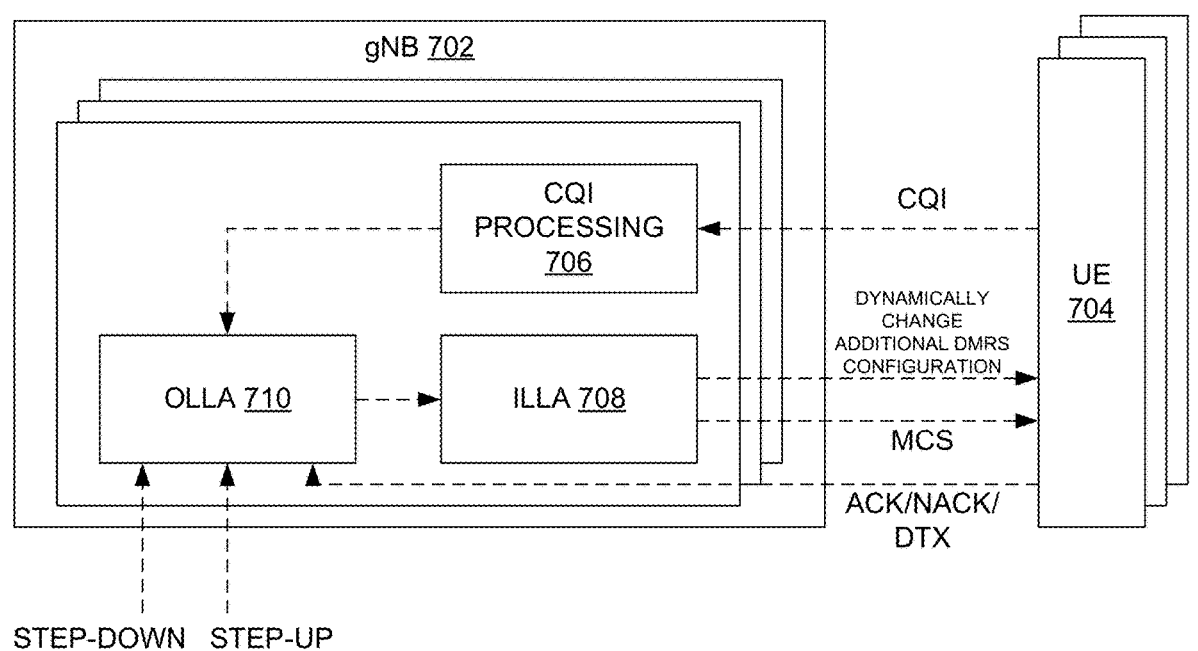
FIG. 7

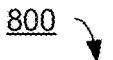
800
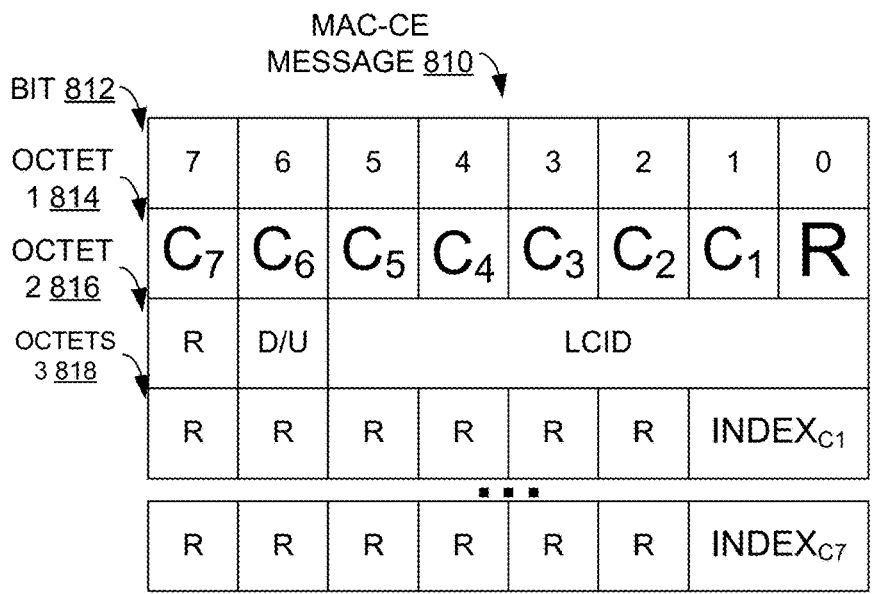
MAC-CE
MESSAGE 810
BIT 812
OCTET
1 814
OCTET
2 816
OCTETS
3 818
| 7 | 6 | 5 | 4 | 3 | 2 | 1 | 0 |
|---|---|---|---|---|---|---|---|
| $C_7$ | $C_6$ | $C_5$ | $C_4$ | $C_3$ | $C_2$ | $C_1$ | R |
| R | D/U | LCID | | | | | |
| R | R | R | R | R | R | INDEX$_{C1}$ | |
$\bullet \ \bullet \ \bullet$
| R | R | R | R | R | R | INDEX$_{C7}$ | |
ADDITIONAL DMRS POSITION
INDICATION 820
| INDEX 822 | ADDITIONAL DRMS POSITION 824 |
|---|---|
| 0 | POS0 |
| 1 | POS1 |
| 2 | POS2 |
| 3 | POS3 |
FIG. 8A

800

1100

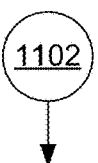

1102

CONFIGURING A FIRST NUMBER OF DEMODULATION REFERENCE SIGNAL POSITIONS IN RADIO RESOURCE CONTROL INFORMATION AS PART OF A CONNECTION SETUP WITH A BASE STATION THAT IS CONFIGURED TO FACILITATE FIRST BROADBAND CELLULAR COMMUNICATIONS, WHEREIN THE FIRST BROADBAND CELLULAR COMMUNICATIONS ARE FACILITATED WITH CARRIER AGGREGATION OF A PRIMARY CELL AND A SECONDARY CELL
1104

AFTER ATTACHING TO THE BASE STATION, RECEIVING A FIRST MEDIUM ACCESS CONTROL CONTROL ELEMENT MESSAGE FROM THE BASE STATION INDICATIVE OF MODIFYING THE FIRST NUMBER OF DEMODULATION REFERENCE SIGNAL POSITIONS TO A SECOND NUMBER OF DEMODULATION REFERENCE SIGNAL POSITIONS FOR THE PRIMARY CELL 1106

AFTER ATTACHING TO THE BASE STATION, RECEIVING A SECOND MEDIUM ACCESS CONTROL CONTROL ELEMENT MESSAGE FROM THE BASE STATION INDICATIVE OF MODIFYING THE FIRST NUMBER OF DEMODULATION REFERENCE SIGNAL POSITIONS TO THE SECOND NUMBER OF DEMODULATION REFERENCE SIGNAL POSITIONS FOR THE SECONDARY CELL 1108

CONDUCTING SECOND BROADBAND CELLULAR COMMUNICATIONS WITH THE BASE STATION ACCORDING TO THE SECOND NUMBER OF DEMODULATION REFERENCE SIGNAL POSITIONS, WHEREIN A THROUGHPUT OF THE SECOND BROADBAND CELLULAR COMMUNICATIONS IS DETERMINED AS A FUNCTION OF A SIZE OF A TRANSPORT BLOCK SET BASED ON THE SECOND NUMBER OF DEMODULATION REFERENCE SIGNAL POSITIONS 1110

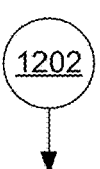

1202

AFTER ATTACHING TO A BASE STATION THAT IS CONFIGURED TO FACILITATE BROADBAND CELLULAR COMMUNICATIONS, RECEIVING, BY A SYSTEM COMPRISING A PROCESSOR, A FIRST MEDIUM ACCESS CONTROL CONTROL ELEMENT MESSAGE FROM THE BASE STATION INDICATIVE OF A FIRST NUMBER OF DEMODULATION REFERENCE SIGNAL POSITIONS THAT WAS ESTABLISHED AS PART OF A CONNECTION SETUP BEING MODIFIED TO A SECOND NUMBER OF DEMODULATION REFERENCE SIGNAL POSITIONS WITH RESPECT TO A PRIMARY CELL, WHEREIN THE BROADBAND CELLULAR COMMUNICATIONS ARE FACILITATED WITH CARRIER AGGREGATION OF THE PRIMARY CELL AND A SECONDARY CELL <u>1204</u>

RECEIVING, BY THE SYSTEM, A SECOND MEDIUM ACCESS CONTROL CONTROL ELEMENT MESSAGE FROM THE BASE STATION INDICATIVE OF THE FIRST NUMBER OF DEMODULATION REFERENCE SIGNAL POSITIONS BEING MODIFIED TO THE SECOND NUMBER OF DEMODULATION REFERENCE SIGNAL POSITIONS WITH RESPECT TO THE SECONDARY CELL <u>1206</u>

CONDUCTING, BY THE SYSTEM, THE BROADBAND CELLULAR COMMUNICATIONS WITH THE BASE STATION ACCORDING TO THE SECOND NUMBER OF DEMODULATION REFERENCE SIGNAL POSITIONS <u>1208</u>

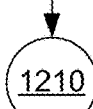

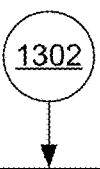

( 1302 )

AFTER ATTACHING TO BASE STATION EQUIPMENT THAT IS CONFIGURED TO FACILITATE BROADBAND CELLULAR COMMUNICATIONS, RECEIVING A FIRST MEDIUM ACCESS CONTROL CONTROL ELEMENT MESSAGE FROM THE BASE STATION EQUIPMENT INDICATIVE OF A MODIFIED NUMBER OF DEMODULATION REFERENCE SIGNAL POSITIONS THAT WAS ESTABLISHED AS PART OF A CONNECTION SETUP WITH RESPECT TO A PRIMARY CELL, WHEREIN THE BROADBAND CELLULAR COMMUNICATIONS ARE FACILITATED WITH CARRIER AGGREGATION OF THE PRIMARY CELL AND A SECONDARY CELL 1304

RECEIVING A SECOND MEDIUM ACCESS CONTROL CONTROL ELEMENT MESSAGE FROM THE BASE STATION EQUIPMENT INDICATIVE OF THE MODIFIED NUMBER OF DEMODULATION REFERENCE SIGNAL POSITIONS WITH RESPECT TO THE SECONDARY CELL 1306

CONDUCTING THE BROADBAND CELLULAR COMMUNICATIONS WITH THE BASE STATION EQUIPMENT ACCORDING TO THE MODIFIED NUMBER OF DEMODULATION REFERENCE SIGNAL POSITIONS 1308

DYNAMIC ADDITIONAL DEMODULATION REFERENCE SIGNAL CONFIGURATION

BACKGROUND

In cellular broadband communications, a user equipment and a core network can communicate to configure a protocol to use in making further communications.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An example system can operate as follows. The system can configure a first number of demodulation reference signal positions in radio resource control information as part of a connection setup with a base station that is configured to facilitate first broadband cellular communications, wherein the first broadband cellular communications are facilitated with carrier aggregation of a primary cell and a secondary cell. The system can, after attaching to the base station, receive a first medium access control control element message from the base station indicative of modifying the first number of demodulation reference signal positions to a second number of demodulation reference signal positions for the primary cell. The system can, after attaching to the base station, receive a second medium access control control element message from the base station indicative of modifying the first number of demodulation reference signal positions to the second number of demodulation reference signal positions for the secondary cell. The system can conduct second broadband cellular communications with the base station according to the second number of demodulation reference signal positions, wherein a throughput of the second broadband cellular communications is determined as a function of a size of a transport block set based on the second number of demodulation reference signal positions.

An example method can comprise, after attaching to a base station that is configured to facilitate broadband cellular communications, receiving, by a system comprising a processor, a first medium access control control element message from the base station indicative of a first number of demodulation reference signal positions that was established as part of a connection setup being modified to a second number of demodulation reference signal positions with respect to a primary cell, wherein the broadband cellular communications are facilitated with carrier aggregation of the primary cell and a secondary cell. The method can further comprise receiving, by the system, a second medium access control control element message from the base station indicative of the first number of demodulation reference signal positions being modified to the second number of demodulation reference signal positions with respect to the secondary cell. The method can further comprise conducting, by the system, the broadband cellular communications with the base station according to the second number of demodulation reference signal positions.

An example non-transitory computer-readable medium can comprise instructions that, in response to execution, cause a system comprising a processor to perform operations. These operations can comprise after attaching to base station equipment that is configured to facilitate broadband cellular communications, receiving a first medium access control control element message from the base station equipment indicative of a modified number of demodulation reference signal positions that was established as part of a connection setup with respect to a primary cell, wherein the broadband cellular communications are facilitated with carrier aggregation of the primary cell and a secondary cell. These operations can further comprise receiving a second medium access control control element message from the base station equipment indicative of the modified number of demodulation reference signal positions with respect to the secondary cell. These operations can further comprise conducting the broadband cellular communications with the base station equipment according to the modified number of demodulation reference signal positions.

BRIEF DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout, and in which:

FIG. 1 illustrates an example demodulation reference signal (DMRS) downlink configuration information element that can facilitate dynamic additional DMRS configuration in accordance with an embodiment of this disclosure;

FIG. 2 illustrates an example DMRS uplink configuration information element that can facilitate dynamic additional DMRS configuration in accordance with an embodiment of this disclosure;

FIGS. 3A and 3B illustrate an example additional DMRS configuration that can facilitate dynamic additional DMRS configuration in accordance with an embodiment of this disclosure;

FIGS. 4A and 4B illustrate another example additional DMRS configuration that can facilitate dynamic additional DMRS configuration in accordance with an embodiment of this disclosure;

FIGS. 5A and 5B illustrate another example additional DMRS configuration that can facilitate dynamic additional DMRS configuration in accordance with an embodiment of this disclosure;

FIGS. 6A and 6B illustrate another example additional DMRS configuration that can facilitate dynamic additional DMRS configuration in accordance with an embodiment of this disclosure;

FIG. 7 illustrates an example system architecture that can facilitate dynamic additional DMRS configuration in accordance with an embodiment of this disclosure;

FIGS. 8A and 8B illustrate example MAC-CE message formats for activation/deactivation of additional DRMS information, and that can facilitate dynamic additional DMRS configuration in accordance with an embodiment of this disclosure.

FIG. 11 illustrates an example process flow that can facilitate dynamic additional DMRS configuration, in accordance with an embodiment of this disclosure;

FIG. 12 illustrates another example process flow that can facilitate dynamic additional DMRS configuration, in accordance with an embodiment of this disclosure;

FIG. 13 illustrates another example process flow that can facilitate dynamic additional DMRS configuration, in accordance with an embodiment of this disclosure;

DETAILED DESCRIPTION

Figure 8A:
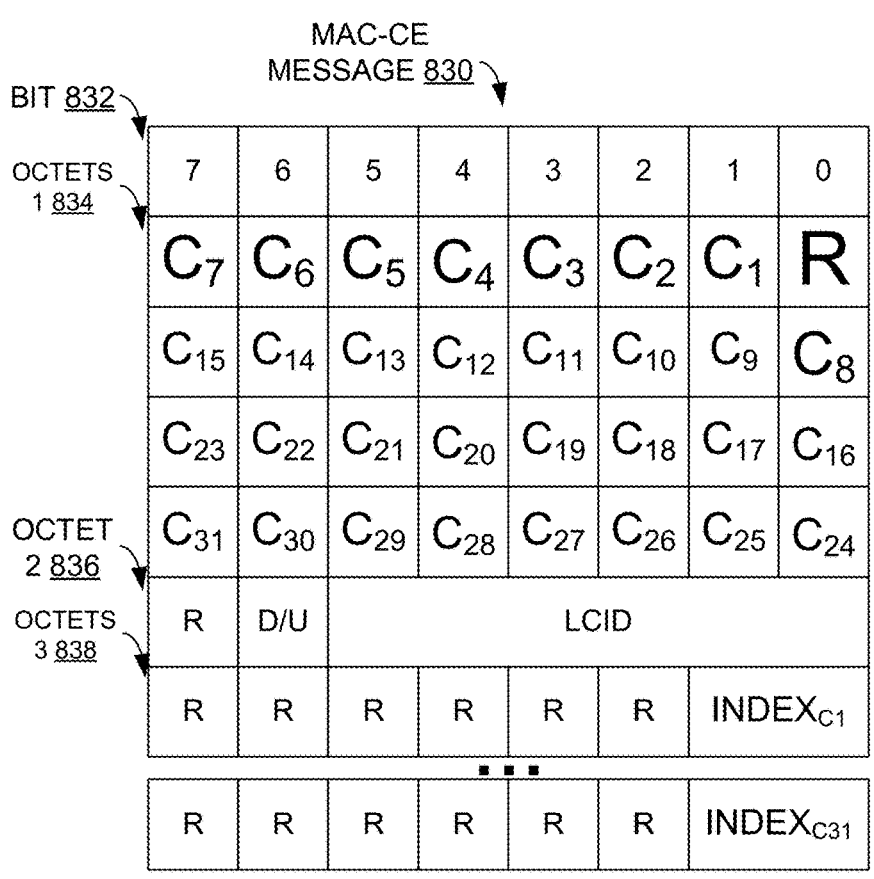

The examples described herein can generally relate to actions taken by user equipment in communicating with a base station to dynamically configure additional demodulation reference signals. This dynamic configuration of additional demodulation reference signals can be established via a Medium Access Control Control Element (MAC-CE) message. In some examples, a MAC-CE message is sent at a MAC layer of cellular communications. Communications conducted at a MAC layer can be faster as compared to, for example, Radio Resource Control (RRC) layer communications.

In some examples of cellular communications, RRC and Non-access stratum (NAS) layer messages can be used to exchange signaling between a base station and user equipment. A MAC layer communication path can be another such path. In MAC layer communications, unique MAC structures can be defined that carry certain control information. In some examples, a unique MAC structure can be implemented to carry control information, and this structure can be referred to as a MAC-CE.

A MAC-CE can work between a base station (MAC) and a user equipment (MAC) for fast signaling communication exchange without involving higher communication layers.

It can be appreciated that corresponding actions can be taken by user equipment to also dynamically configure additional demodulation reference signals.

In cellular communications, there can be a master cell group (MCG) to which a user equipment (UE) initially registers. A cell that is used to initiate initial access can be referred to as a primary cell (Pcell). A Pcell can be combined with one or more secondary cells (Scells) under a MCG using carrier aggregation techniques, which can generally involve combining multiple carriers to increase bandwidth available to UEs.

The examples herein generally relate to 5G cellular communications networks, where Pcells and Scells are used. It can be appreciated that the present techniques can be applied to other types of cellular communications networks for dynamically configuring additional demodulation reference signals (DMRSes).

A DMRS can be utilized by a 5G new radio (NR) receiver to produce channel estimates for demodulation of an associated physical channel. A design and mapping of each DMRS can be specific to each 5G physical channel (e.g., physical broadcast channel (PBCH), physical downlink control channel (PDCCH), physical downlink shared channel (PDSCH), physical uplink control channel (PUSCH), and physical uplink shared channel (PUCCH)). DMRS can be UE specific, and be transmitted on demand. In some examples, a DMRS does not extend outside of a scheduled physical resource of a channel it supports. DMRS can support massive multi-user multiple-input and multiple-output (MIMO). DMRS can be beamformed and, in some examples, support up to 13 orthogonal layers. A DMRS sequence for a cyclic-prefix orthogonal frequency division multiplexing (CP-OFDM) version can be quadrature phase shift keying (QPSK) based on Gold Sequences.

With respect to PDSCH, DMRS can comprise front-loaded DMRS symbols (e.g., either 1 or 2) that are located as follows:

1. Slot based (DMRS mapping type-A): This can be a fixed orthogonal frequency division multiplexing (OFDM) symbol regardless of PDSCH assignment and that is configurable between lo={2,3}. Here, "lo" means dmrs-typeA-position, which can be present at synmbol2 or symbol3.

2. Non-slot based (DMRS mapping type-B): This can be a first OFDM symbol assigned for PDSCH—e.g., mini slots.

In some examples, additional DMRS symbols can be configured in scenarios such as high-speed mobility (e.g., handover); when downlink (DL)/uplink (UL) block error ratio (BLER) is high, and UE-reported channel condition is poor; and when a UE is located on a cell edge, and, because of that, the UE is not able to decode or send DL and UL packets.

With regard to PUSCH DMRS, in an uplink, two waveform types can be supported (e.g., CP-OFDM, and discrete Fourier transform-spread orthogonal frequency division multiplexing (DFT-S-OFDM)). For instance, a gold sequence can be used in CP-OFDM, and a Zadoff-Chu sequence can be used in DFT-S-OFDM. Front loaded DMRS symbols (e.g., either 1 or 2) can be located at a first OFDM symbol that is assigned for PUSCH.

The present techniques can be implemented to solve the following problems that can relate to Scells with respect to downlink carrier aggregation.

One problem that can be solved by implementing the present techniques can be when a 5G base station (sometimes referred to as gNodeB or gNB; or more generally a base station) includes an dmrs-AdditionalPosition information element (IE) using DMRS-DownlinkConfig and DMRS-UplinkConfig for downlink and uplink, respectively, during a UE's attach or another UE-specific procedure, then that configuration can stay with the UE during the lifetime of the scenario unless it is modified by a radio resource control (RRC) modification procedure.

A dmrs-AdditionalPosition IE for DL and UL is indicated in FIGS. 1 and 2, respectively. That is, FIG. 1 illustrates an example DMRS downlink configuration information element 100 that can facilitate dynamic additional DMRS configuration in accordance with an embodiment of this disclosure. In example DMRS downlink configuration information element 100, there is dmrs-AdditionalPosition 102.

And FIG. 2 illustrates an example DMRS uplink configuration information element 200 that can facilitate dynamic additional DMRS configuration in accordance with an embodiment of this disclosure. In the example DMRS uplink configuration information element 200, there is dmrs-AdditionalPosition 202.

Once this configuration is received by the UE, then the gNB and the UE can consider that configuration while determining a transport block (TB; which can generally determine data throughput of the UE). A TB can vary based on a number of additional DMRS positions that are configured.

Where a UE has one or more secondary cells that are activated, and the UE is configured with additional DMRS configuration for uplink and/or downlink, then this configuration can be applicable to all secondary cells where the UE is configured for Scells through RRC messaging.

Data throughput (TP) can be inversely proportional to a number of configured additional DMRS positions—that is, where more additional DMRS symbols are configured then there can be less data throughput.

FIGS. 3A and 3B illustrate an example additional DMRS configuration 300A and 300B that can facilitate dynamic additional DMRS configuration in accordance with an embodiment of this disclosure. Example additional DMRS configuration 300A and 300B (as well as example additional DMRS configuration 400A and 400B of FIGS. 4A and 4B; example additional DMRS configuration 500A and 400B of FIGS. 5A and 5B; and example additional DMRS configuration 600A and 600B of FIGS. 6A and 6B) can have the following settings:

pdsch.NumLayers=4;
pdsch.MappingType='A';
pdsch.SymbolAllocation=[0 15]; % [startSymbol Length]
dmrs.DMRSconfigurationType=1;
dmrs.DMRSLength=1;
dmrs.DMRSTypeAPosition=2;
dmrs.NumCDMGroupsWithoutData=2;
dmrs.NIDNSCID=10;
dmrs.NSCID=0;

Additionally, example additional DMRS configuration 300A and 300B has "dmrs.DMRSAdditionalPosition=0;" which indicates that there are no additional DMRS positions configured. This configuration is illustrated in additional DMRS configuration 300A and 300B, which comprises port 1000 302A (with subcarriers 304A and OFDM symbols 306A); port 1001 302B (with subcarriers 304B and OFDM symbols 306B); port 1002 302C (with subcarriers 304C and OFDM symbols 306C); and port 1003 302D (with subcarriers 304D and OFDM symbols 306D).

Example additional DMRS configuration 300A and 300B also comprises dynamic additional DMRS configuration component 310 (which can comprise a computer component that implements the present techniques) and key 308. FIGS. 3A and 3B relate to a 4-port antenna configuration, and dynamic additional DMRS configuration component 310 can comprise a 4-port dynamic additional DMRS configuration component.

FIGS. 4A and 4B illustrate another example additional DMRS configuration 400A and 400B that can facilitate dynamic additional DMRS configuration in accordance with an embodiment of this disclosure.

Example additional DMRS configuration 400A and 400B has "dmrs.DMRSAdditionalPosition=1;" which indicates that there is one additional DMRS position configured. This configuration is illustrated in additional DMRS configuration 400A and 400B, which comprises port 1000 402A (with subcarriers 404A and OFDM symbols 406A); port 1001 402B (with subcarriers 404B and OFDM symbols 406B); port 1002 402C (with subcarriers 404C and OFDM symbols 406C); and port 1003 402D (with subcarriers 404D and OFDM symbols 406D).

Example additional DMRS configuration 400A and 400B also comprises dynamic additional DMRS configuration component 410 (which can comprise a computer component that implements the present techniques) and key 408.

FIGS. 5A and 5B illustrate another example additional DMRS configuration 500A and 500B that can facilitate dynamic additional DMRS configuration in accordance with an embodiment of this disclosure.

Example additional DMRS configuration 500A and 500B has "dmrs.DMRSAdditionalPosition=2;" which indicates that there are two additional DMRS positions configured. This configuration is illustrated in additional DMRS configuration 500A and 500B, which comprises port 1000 502A (with subcarriers 504A and OFDM symbols 506A); port 1001 502B (with subcarriers 504B and OFDM symbols 506B); port 1002 502C (with subcarriers 504C and OFDM symbols 506C); and port 1003 502D (with subcarriers 504D and OFDM symbols 506D).

Example additional DMRS configuration 500A and 500B also comprises dynamic additional DMRS configuration component 510 (which can comprise a computer component that implements the present techniques) and key 508.

FIGS. 6A and 6B illustrate another example additional DMRS configuration 600A and 600B that can facilitate dynamic additional DMRS configuration in accordance with an embodiment of this disclosure.

Example additional DMRS configuration 600A and 600B has "dmrs.DMRSAdditionalPosition=3;" which indicates that there are three additional DMRS positions configured. This configuration is illustrated in additional DMRS configuration 600A and 600B, which comprises port 1000 602A (with subcarriers 604A and OFDM symbols 606A); port 1001 602B (with subcarriers 604B and OFDM symbols 606B); port 1002 602C (with subcarriers 604C and OFDM symbols 606C); and port 1003 602D (with subcarriers 604D and OFDM symbols 606D).

Example additional DMRS configuration 600A and 600B also comprises dynamic additional DMRS configuration component 610 (which can comprise a computer component that implements the present techniques) and key 608.

In the example of FIGS. 3A and 3B, there is no additional DMRS configured. In the example of FIGS. 4A and 4B, there is one additional DMRS symbol configured. In the example of FIGS. 5A and 5B, there are two additional DMRS symbols configured. In the example of FIGS. 6A and 6B, there are three additional DMRS symbols configured. So, in these examples, data throughput in FIGS. 3A and 3B can be greater than in FIGS. 4A and 4B, which can be greater than in FIGS. 5A and 5B, which can be greater than in FIGS. 6A and 6B.

As part of dynamically configuring additional DMRS positions, a component (e.g., dynamic additional DMRS configuration component 310 of FIGS. 3A and 3B) can dynamically switch between the configurations of FIGS. 3A and AB, 4A and 4B, 5A and 5B, and 6A and 6B One problem with additional DMRS configuration can be physical resource block (PRB) wastage because of an unnecessarily-configured higher additional DMRS position. Implementing the present techniques to dynamically change the additional DMRS position for each primary carrier component ($P_{cc}$) and secondary carrier component ($S_{cc}$) can be implemented to solve this problem.

Take an example where, during UE attach, a gNB configured an additional DMRS configuration in pos3 (indicating 3 additional DMRS symbols) for primary and secondary cells. Where radio/channel condition is good, where the UE is reporting a channel quality indicator (CQI), and UL and DL data BLER % are under 1% (indicating that a PDSCH and PUSCH packet decoding success rate is high), then having 3 symbols for additional DMRS can negatively impact data throughput.

Some prior approaches do not allow changing this configuration dynamically, and because of that, the gNB can be unnecessarily wasting a physical resource block.

Another problem with additional DMRS configuration can relate to frequent UE release, a UE performing a RRC reestablishment procedure, or a secondary cell failure procedure, because channel condition is poor. Implementing the present techniques to dynamically change the additional DMRS position can be implemented to solve this problem.

Take an example where, during UE attach, the gNB has not configured an additional DMRS configuration in DL and or UL. Where radio/channel condition is poor for the primary cell and/or secondary cell(s), where the UE is reporting CQI for primary and/or secondary cell(s) that is bad, and UL and DL BLER % is high for both cells (e.g., >20%, which can indicate that a success rate of decoding PDSCH packets is poor), it can be that the UE or gNB can perform a UE release, secondary cell failure procedure, and/or RRC reestablishment procedure. This procedure can take a long time to restore the connection. This problem can be avoided by dynamically configuring additional DMRS positions for primary and secondary cells based on channel quality to sustain the connection. In some prior approaches, this configuration cannot be dynamically altered.

Another problem with additional DMRS configuration can relate to a high-speed mobility (handover) scenario. In a high-speed handover scenario, channel/radio condition can be kept on frequently with respect to primary and/or secondary cells, to sustain and maintain good quality for a call. Additional DMRS symbols can be adapted dynamically based on reported CQI and BLER for all activated carriers, to achieve good throughput, while also not compromising by wasting physical resources.

Another problem with additional DMRS configuration can relate to a scenario where a UE is located at a cell edge. It can be that, when a UE is located at a cell edge, the UE's channel quality is subpar, and BLER % can be high for primary and/or secondary cells. To improve this condition, a gNB can quickly adapt an additional DMRS configuration. It can be that adapting a DMRS configuration based on link adaptation is not supported by prior approaches.

The present techniques for dynamic additional DMRS configuration can be implemented as follows.

One approach can be to use a new MAC-CE (e.g., "activation/deactivation of additional DMRS information"), which can be a MAC-CE for downlink and uplink, where a highest ServCellIndex of a serving cell with configured downlink/uplink is less than 8 (or some threshold number). There can be downlink secondary cells activation with downlink data flow with logic for triggering dynamic additional DMRS configuration using MAC-CE for primary and/or secondary cell(s).

Uplink secondary cell activation with uplink data flow with logic for triggering dynamic additional DMRS configuration using MAC-CE can also be implemented.

Another approach can be to use a new MAC-CE (e.g., "activation/deactivation of additional DMRS information"), which can be a MAC-CE for downlink and uplink, where a highest ServCellIndex of a serving cell with configured downlink/uplink is 8 or more (or some threshold number). There can be downlink secondary cells activation with downlink data flow with logic for triggering dynamic additional DMRS configuration using MAC-CE for primary and/or secondary cell(s).

Uplink secondary cell activation with uplink data flow with logic for triggering dynamic additional DMRS configuration using MAC-CE can also be implemented.

Another approach can be to use a new IE in UE capability for downlink and uplink. A new IE, dynamicAdditionalDMRSSupport, can be added for downlink in FeatureSetDownlink. If UE supports this IE, it can mean that the UE will support dynamic additional DMRS configuration changes in a downlink direction.

Additionally, a new IE, dynamicAdditionalDMRSSupport, can be added for downlink in FeatureSetUplink. If UE supports this IE, it can mean that the UE will support dynamic additional DMRS configuration changes in an uplink direction.

Another approach can be to use a new IE, dynamicAdditionalDMRSSupport, in PDSCH-Config for downlink and PUSCH-Config for uplink.

Another approach can be to configure UE to be capable of handling a MAC-CE for downlink and uplink with secondary cell activated. That is, UE can be configured to handle one or both of activation/deactivation of additional DMRS information MAC-CE with a highest ServCellIndex of the serving cell with configured downlink/uplink less than 8 (or a threshold value), and activation/deactivation of additional DMRS information MAC-CE with a highest ServCellIndex of the serving cell with configured downlink/uplink greater than or equal to 8 (or a threshold value).

In this approach, a gNB can send one of these MAC-CEs for downlink with D=1 and with a proper value of index determined based on an algorithm. This field can be decoded by UE, which can apply the new configuration in further processing.

A gNB can send one of these MAC-CEs for uplink with U=0 and with a proper value of index determined based on an algorithm. This field can be decoded by UE, which can apply the new configuration in further processing.

Downlink secondary cells activation with downlink data flow with logic for triggering dynamic additional DMRS configuration using MAC-CE for primary and/or secondary cells can be applied. Additionally, uplink secondary cells activation with uplink data flow with logic for triggering dynamic additional DMRS configuration using MAC-CE can be applied.

FIG. 7 illustrates an example system architecture 700 that can facilitate dynamic additional DMRS configuration in accordance with an embodiment of this disclosure. System architecture comprises gNB 702, UE 704, CQI processing 706, inner loop link adaptation (ILLA) 708, and gNB outer loop link adaptation (OLLA) 710 (which, in some examples, can more generally be a base station outer loop link adaptation).

In some examples, gNB 702 can determine additional DMRS information dynamically, as follows. As depicted in FIG. 7, where UE 704 is reporting channel quality using CQI, and hybrid automatic repeat request (HARQ) feedback (e.g., acknowledgment (ACK), negative acknowledgment (NACK), and discontinuous transmission (DTX)) for data transmission for primary and secondary cells, then, OLLA 710 can handle the HARQ feedback, and CQI processing 706 (for all activated cells) can handle CQI reported by UE 704.

Based on these two inputs, ILLA 708 can determine a modulation coding scheme (MCS) and additional DMRS position to be applied to UL and DL data transmission for primary and secondary cells where Scells are already activated.

ILLA 708 can determine the MCS by considering the CQI reported by UE 704, and HARQ feedback. In some examples, the higher the MCS, the better the channel/radio quality, meaning a smaller number of additional DMRS positions configured to UE 704 using the present techniques.

Where ILLA 708 determines to use a lower MCS, meaning the channel quality reported by UE 704 is not good and BLER is high, this can mean that ILLA 708 determines to increase the additional DMRS position in a DL/UL MAC-CE message to decrease the BLER %.

The following can be communicated as part of conveying capability of a UE. A FeatureSetCombination information element can be as follows:

```
-- ASN1START
-- TAG-FEATURESETCOMBINATION-START
FeatureSetCombination ::=              SEQUENCE (SIZE
    (1..maxSimultaneousBands)) OF FeatureSetsPerBand
FeatureSetsPerBand ::=                 SEQUENCE (SIZE
    (1..maxFeatureSetsPerBand)) OF FeatureSet
FeatureSet ::=                         CHOICE {
    eutra                              SEQUENCE {
        downlinkSetEUTRA               FeatureSetEUTRA-
DownlinkId,
        uplinkSetEUTRA                 FeatureSetEUTRA-
UplinkId
    } ,
    nr                                 SEQUENCE {
        downlinkSetNR
FeatureSetDownlinkId,
        uplinkSetNR                    FeatureSetUplinkId
    }
}
-- TAG-FEATURESETCOMBINATION-STOP
-- ASN1STOP
```

An IE, FeatureSetDownlink, can indicate a set of features that a UE supports on carriers corresponding to one band entry in a band combination. A FeatureSetDownlink IE can be as follows:

```
-- ASN1START
-- TAG-FEATURESETDOWNLINK-START
FeatureSetDownlink ::=                 SEQUENCE {
    featureSetListPerDownlinkCC        SEQUENCE (SIZE
    (1..maxNrofServingCells)) OF FeatureSetDownlinkPerCC-Id,
        intraBandFreqSeparationDL
FreqSeparationClass
OPTIONAL,
        scalingFactor                  ENUMERATED
{f0p4, f0p75, f0p8}
OPTIONAL,
        crossCarrierScheduling-OtherSCS ENUMERATED
{supported}
OPTIONAL,
        scellWithoutSSB                ENUMERATED
{supported}
OPTIONAL,
        csi-RS-MeasSCellWithoutSSB     ENUMERATED
{supported}
OPTIONAL,
    ....................
        -- An IE to indicate UE capability to support downlink
dynamic additional DMRS feature.
        dynamicAdditionalDMRSSupport   ENUMERATED
{supported}
OPTIONAL,
    ....................
        dummy1                         ENUMERATED
{supported}
OPTIONAL,
        dummy6                         SEQUENCE (SIZE
    (1.. maxNrofCodebooks)) OF DummyD
OPTIONAL,
        dummy7                         SEQUENCE (SIZE
    (1.. maxNrofCodebooks)) OF DummyE
OPTIONAL
}
```

-continued

```
    -- TAG-FEATURESETDOWNLINK-STOP
    -- ASN1STOP
```

In a FeatureSetDownlink IE, a UE can set a dynamicAdditionalDMRSSupport field to support where the UE is capable of supporting downlink additional DMRS features.

An IE, FeatureSetUplink, can indicate a set of features that a UE supports on carriers corresponding to one band entry in a band combination. A FeatureSetUplink IE can be as follows:

```
-- ASN1START
-- TAG-FEATURESETUPLINK-START
FeatureSetUplink ::=                   SEQUENCE {
    featureSetListPerUplinkCC          SEQUENCE (SIZE (1..
maxNrofServingCells)) OF FeatureSetUplinkPerCC-Id,
        scalingFactor                  ENUMERATED {f0p4,
f0p75, f0p8}
OPTIONAL,
        crossCarrierScheduling-OtherSCS ENUMERATED
{supported}
OPTIONAL,
        intraBandFreqSeparationUL      FreqSeparationClass
OPTIONAL,
        searchSpaceSharingCA-UL        ENUMERATED
{supported}
OPTIONAL,
    ....................
        -- An IE to indicate UE capability to support Uplink
dynamic additional DMRS feature.
        dynamicAdditionalDMRSSupport   ENUMERATED
{supported}
OPTIONAL,
    ....................
        dummy1                         DummyI
OPTIONAL,
        supportedSRS-Resources         SRS-Resources
OPTIONAL,
        twoPUCCH-Group                 ENUMERATED
{supported}
OPTIONAL,
        dynamicSwitchSUL               ENUMERATED
{supported}
OPTIONAL,
        simultaneousTxSUL-NonSUL       ENUMERATED
{supported}
OPTIONAL,
        pusch-ProcessingType1-DifferentTB-PerSlot SEQUENCE {
            scs-15kHz                  ENUMERATED
{upto2, upto4, upto7}
OPTIONAL,
            scs-30kHz                  ENUMERATED
{upto2, upto4, upto7}
OPTIONAL,
            scs-60kHz                  ENUMERATED
{upto2, upto4, upto7}
OPTIONAL,
            scs-120kHz                 ENUMERATED
{upto2, upto4, upto7}
OPTIONAL
        }
OPTIONAL,
        dummy2                         DummyF
OPTIONAL
}
-- TAG-FEATURESETUPLINK-STOP
-- ASN1STOP
```

In a FeatureSetUplink IE, a UE can set a dynamicAdditionalDMRSSupport field to support where the UE is capable of supporting uplink additional DMRS features.

A PDSCH-Config IE that is used to configure a UE's specific PDSCH parameters can be as follows:

```
-- ASN1START
-- TAG-PDSCH-CONFIG-START
PDSCH-Config ::=                           SEQUENCE {
        dataScramblingIdentityPDSCH        INTEGER
   (0..1023)
OPTIONAL,  -- Need S
        dmrs-DownlinkForPDSCH-MappingTypeA SetupRelease {
DMRS-DownlinkConfig }
OPTIONAL,  -- Need M
        dmrs-DownlinkForPDSCH-MappingTypeB SetupRelease {
DMRS-DownlinkConfig }
OPTIONAL,  -- Need M
        ...............
        ...............
            -- An IE to support dynamic additional DMRS position
change.
        dynamicAdditionalDmrsSupport       ENUMERATED
{enabled}          OPTIONAL,  -- Need S
        ...............
        ...............
        tci-StatesToAddModList             SEQUENCE
   (SIZE(1..maxNrofTCI-States)) OF TCI-State
OPTIONAL,  -- Need N
        pdsch-TimeDomainAllocationList-r16 SetupRelease {
PDSCH-TimeDomainResourceAllocationList-r16 }
OPTIONAL,  -- Need M
        repetitionSchemeConfig-r16         SetupRelease {
RepetitionSchemeConfig-r16}                OPTIONAL
-- Need M
        ]]
}
-- TAG-PDSCH-CONFIG-STOP
-- ASN1STOP
```

An IE, PUSCH-Config, that can be used to configure UE specific PUSCH parameters applicable to a particular band width part (BWP) can be as follows:

```
-- ASN1START
-- TAG-PUSCH-CONFIG-START
PUSCH-Config ::=                           SEQUENCE {
        dataScramblingIdentityPUSCH        INTEGER
   (0..1023)
OPTIONAL,  -- Need S
        txConfig                           ENUMERATED
{codebook, nonCodebook}
OPTIONAL,  -- Need S
        dmrs-UplinkForPUSCH-MappingTypeA   SetupRelease {
DMRS-UplinkConfig }
OPTIONAL,  -- Need M
        dmrs-UplinkForPUSCH-MappingTypeB   SetupRelease {
DMRS-UplinkConfig }
OPTIONAL,  -- Need M
        ...............
        ...............
            -- Newly proposed IE to support dynamic additional
DMRS position change.
        dynamicAdditionalDmrsSupport       ENUMERATED
{enabled}          OPTIONAL,  -- Need S
        ...............
        ...............
}
-- TAG-PUSCH-CONFIG-STOP
  -- ASN1STOP
```

FIGS. 8A and 8B illustrate example MAC-CE message formats 800 for activation/deactivation of additional DRMS information, and that can facilitate dynamic additional DMRS configuration in accordance with an embodiment of this disclosure.

Example MAC-CE message formats 800 comprises MAC-CE message 810, Additional DMRS Position indication 820, and MAC-CE message 830. In turn, MAC-CE message 810 comprises bit 812, octet 1 814, octet 2 816, and octets 3 818. Additional DMRS position indication 820 comprises index 822 and additional DMRS position 824. MAC-CE message 830 comprises bit 832, octets 1 834, octet 2 836, and octets 3 838.

In MAC-CE message 810, bit 812 indicates a bit number for octet 1 814, octet 2 816, and octets 3 818. There are 8 bits, numbered 0-7. Octet 1 814 can store information where, each bit indicates whether an Scell, corresponding to that bit, is activated. Octet 2 816 can store the following information: bit 7 can be reserved (R); bit 6 can store an identifier for direction (D being downlink, and U being uplink); bits 5-1 can store a logical channel identifier (LCID). Octets 3 818 can store the following information: bits 7-2 can be reserved (R); and bits 1-0 can store additional DMRS position indication 819. Each octet of octets 3 818 can correspond to a different Scell (e.g., to Scells indicated by octet 1 812).

In additional DMRS position indication 820, index 822 indicates a value stored in bits 1-0 of octet 2 816, and additional DMRS position 824 indicates a corresponding number of additional DMRS positions.

There are four possible index values in index 822, and those four values can be expressed in binary in the two bits of bits 1-0 of octet 2 816.

In MAC-CE message 830, bit 832 indicates a bit number for octets 1 834, octet 2 836, and octets 3 838. There are 8 bits, numbered 0-7. Octets 1 834 can store information where each bit indicates whether a Scell that corresponds to that bit is activated. Octet 2 836 can store the following information: bit 7 can be reserved (R); bit 6 can store an identifier for direction (D being downlink, and U being uplink); bits 5-1 can store a logical channel identifier (LCID). Octets 3 838 can store the following information: bits 7-2 can be reserved (R); and bits 1-0 can store additional DMRS position indication 839. Each octet of octets 3 838 can correspond to a different Scell (e.g., to Scells indicated by octet 1 832).

Put another way, a MAC-CE for activation/deactivation of additional DMRS information can be implemented as follows.

For activation/deactivation of additional DMRS information, a MAC-CE with a highest ServCellIndex of a serving cell with configured downlink/uplink less than 8, the MAC-CE can be configured as follows.

$C_i$ (e.g., $C_1$-$C_7$) can indicate whether there is a Scell configured for the MAC entity with ScellIndex i. This field can indicate the activation/deactivation status of the Scell with ScellIndex i, and in other cases the MAC entity can ignore the $C_i$ field. The $C_i$ field can be set to 1 to indicate that the Scell with ScellIndex i shall be activated. The $C_i$ field can be set to 0 to indicate that the Scell with ScellIndex i shall be deactivated.

$Index_{ci}$ (e.g., $Index_{c1}$-$Index_{c7}$) can indicate, where the $C_i$ field is set to 1, that dynamic additional DMRS configuration is configured for ScellIndex i.

In some examples, R can be a reserved bit, and set to 0.

D/U can indicate that, where it is set to 1 that means that MAC-CE is triggered in a downlink direction, and where it is set to 0 that means that MAC-CE is triggered for an uplink direction.

For activation/deactivation of additional DMRS information, a MAC-CE with a highest ServCellIndex of a serving cell with configured downlink/uplink between 8 and 31 (inclusive), the MAC-CE can be configured as follows. In general, this MAC-CE can be similar to the MAC-CE for no more than 7 serving cells, but with $C_1$-$C_{31}$ and $Index_{c1}$-$Index_{c31}$, instead of with $C_1$-$C_7$ and $Index_{c1}$-$Index_{c7}$.

Figure 9A:
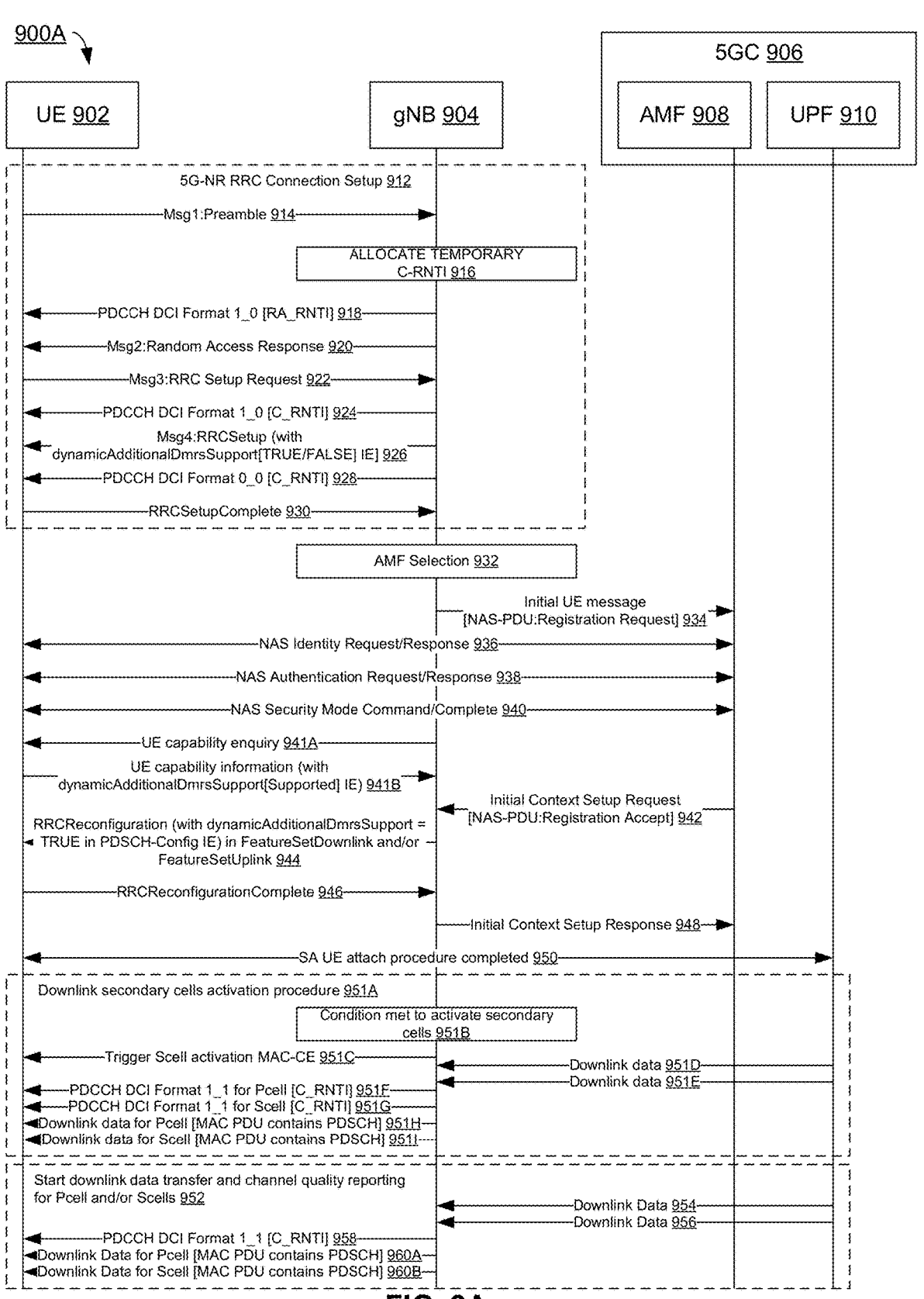
FIGS. 9A and 9B illustrate an example signal flow for dynamic additional DMRS configuration for a downlink, and that can facilitate dynamic additional DMRS configuration in accordance with an embodiment of this disclosure.
Figure 9B:
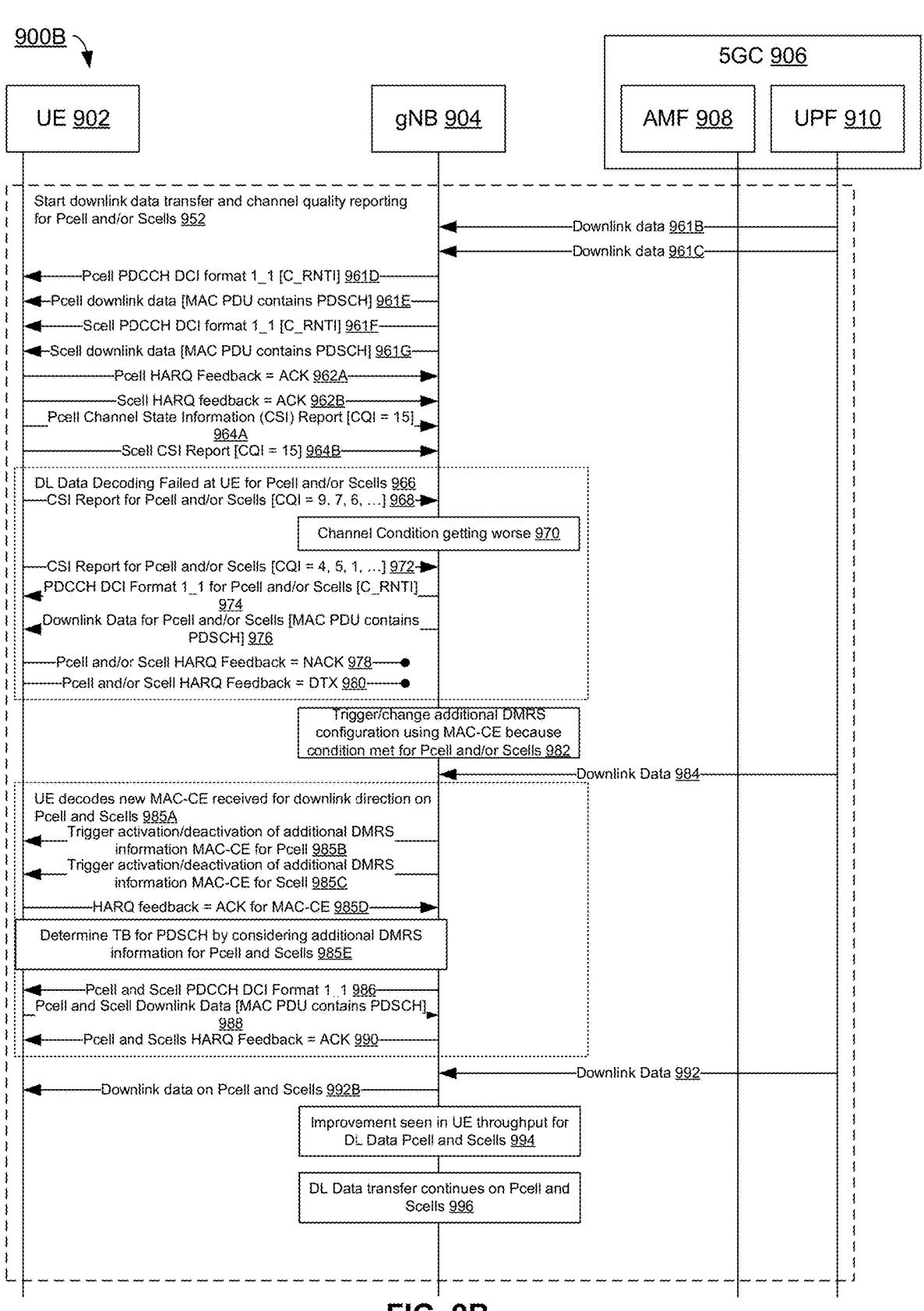

FIGS. 9A and 9B illustrate an example signal flow 900 for attaching with downlink secondary cell activation, and downlink data flow that triggers additional DMRS using MAC-CE. As depicted, in signal flow 900, communications are sent between user equipment 902, gNB 904, and 5G core (5GC) 906 (which comprises access and mobility management function (AMF) 908 and user plane function (UPF) 910).

The signal flow of signal flow 900 is an example signal flow, and there can be signal flows that implement different signals, or the signals of signal flow 900 in a different order, as part of facilitating dynamic additional DMRS configuration.

As depicted in signal flow 900, the following occurs:

5G-NR RRC connection setup 912

Msg1: Preamble 914

Allocate temporary Cell Radio Network Temporary Identifier (C-RNTI) 916

PDCCH DCI Format 1_0 [Random Access RNTI (RA_RNTI)] 918

Msg2: Random Access Response 920

Msg3: RRCSetupRequest 922

PDCCH DCI Format 1_0 [C_RNTI] 924

Msg4: RRCSetup 926, where a dynamicAdditionalDmrs-Support[TRUE/FALSE] IE is contained in this message, and can be added as part of the present techniques PDCCH DCI Format 0_0 [C_RNTI] 928

RRCSetupComplete 930

AMF Selection 932

Initial UE message [Non-Access-Stratum-Protocol Data Unit (NAS-PDU): Registration Request] 934

NAS Identity Request/Response 936

NAS Authentication Request/Response 938

NAS Security Mode Command/Complete 940

UE capability enquiry 941A

UE capability information, with dynamicAdditionalDmrsSupport[Supported] IE in FeatureSetDownlink and/or FeatureSetUplink 941B Initial Context Setup Request [NAS-PDU: Registration Accept] 942

RRCReconfiguration with dynamicAdditionalDmrsSupport=TRUE in PDSCH-Config IE where UE supports this feature in downlink 944 (which can indicate that the UE already supports a dynamic additional DMRS feature that is communicated by the UE in 941B as part of UE capability information; here, a gNB can add this IE in a RRCE Reconfiguration message)

RRCReconfigurationComplete 946

Initial Context Setup Response 948

Standalone (SA) UE attach procedure completed 950

Downlink secondary cells activation procedure 951A

Condition met to activate secondary cells 951B

Trigger Scell activation MAC-CE 951C

Downlink data 951D

Downlink data 951E

PDCCH DCI Format 1_1 for Pcell [C_RNTI] 951F

PDCCH DCI Format 1_1 for Scell [C_RNTI] 951G

Downlink data for Pcell [MAC PDU contains PDSCH] 951H

Downlink data for Scell [MAC PDU contains PDSCH] 951I

Start downlink data transfer and channel quality reporting for Pcell and/or Scells 952

Downlink data 954

Downlink data 956

PDCCH DCI Format 1_1 [C_RNTI] 958

Downlink Data for Pcell [MAC PDU contains PDSCH] 960A

Downlink Data for Scell [MAC PDU contains PDSCH] 960A

Start downlink data transfer and channel quality reporting for Pcell and/or Scells 961A Downlink data 961B Downlink data 961C Pcell PDCCH DCI format 1_1 [C_RNTI] 961D Pcell downlink data [MAC PDU contains PDSCH] 961E Scell PDCCH DCI format 1_1 [C_RNTI] 961F Scell downlink data [MAC PDU contains PDSCH] 961G Pcell HARQ Feedback=ACK 962A Scell HARQ feedback=ACK 962B Pcell Channel State Information (CSI) Report [CQI=15] 964A Scell CSI Report [CQI=15] 964B DL data decoding failed at UE for Pcell and/or Scells 966

CSI Report for Pcell and/or Scells [CQI=9, 7, 6, . . . ] 968

Channel condition gets worse 970

CSI Report for Pcell and/or Scells [CQI=4, 5, 1, . . . ] 572

PDCCH DCI Format 1_1 for Pcell and Scells [C_RNTI] 974

Downlink Data for Pcell and Scells [MAC PDU contains PDSCH] 976

Pcell and Scell HARQ Feedback=NACK 978

Pcell and Scell HARD Feedback=DTX 980

Trigger/change additional DMRS configuration in DL DCI because condition met for Pcell and/or Scells 982, where, in some examples, a condition can be CQI reporting is bad for a certain threshold and period; HARQ feedback is reported as NACK (e.g., BLER is high for a certain threshold and period); UE is on a cell edge; and/or UE is on high mobility Downlink Data 984

UE decodes new MAC-CE received for downlink direction on Pcell and Scells 985A

Trigger activation/deactivation of additional DMRS information MAC-CE for Pcell 985B (with a MAC-CE according to the present techniques)

Trigger activation/deactivation of additional DMRS information MAC-CE for Scell 985C (with a MAC-CE according to the present techniques)

HARQ feedback=ACK for MAC-CE 985D

Determine TB for PDSCH by considering additional DMRS information for Pcell and Scells 985E Pcell and Scell PDCCH DCI Format 1_1 986

Pcell and Scell Downlink Data [MAC PDU contains PDSCH] 988

Pcell and Scells HARQ Feedback=ACK 990

Downlink Data 992A

Downlink data on Pcell and Scells 992B

Improvement seen in UE throughput for DL Data 994

DL Data transfer continues 996

Figure 10A:
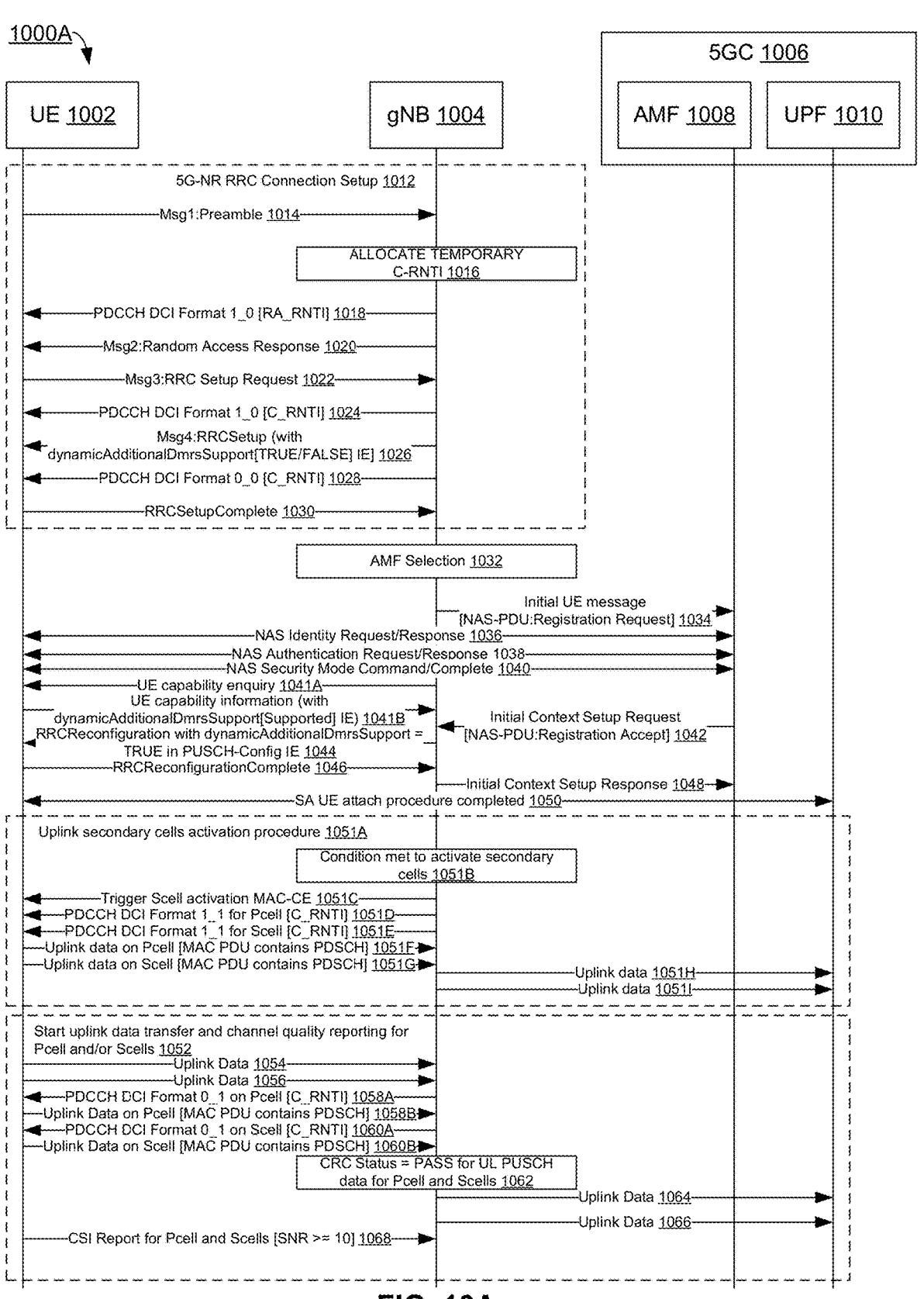
FIGS. 10A and 10B illustrates an example signal flow for dynamic additional DMRS configuration for a uplink, and that can facilitate dynamic additional DMRS configuration in accordance with an embodiment of this disclosure.
Figure 10B:
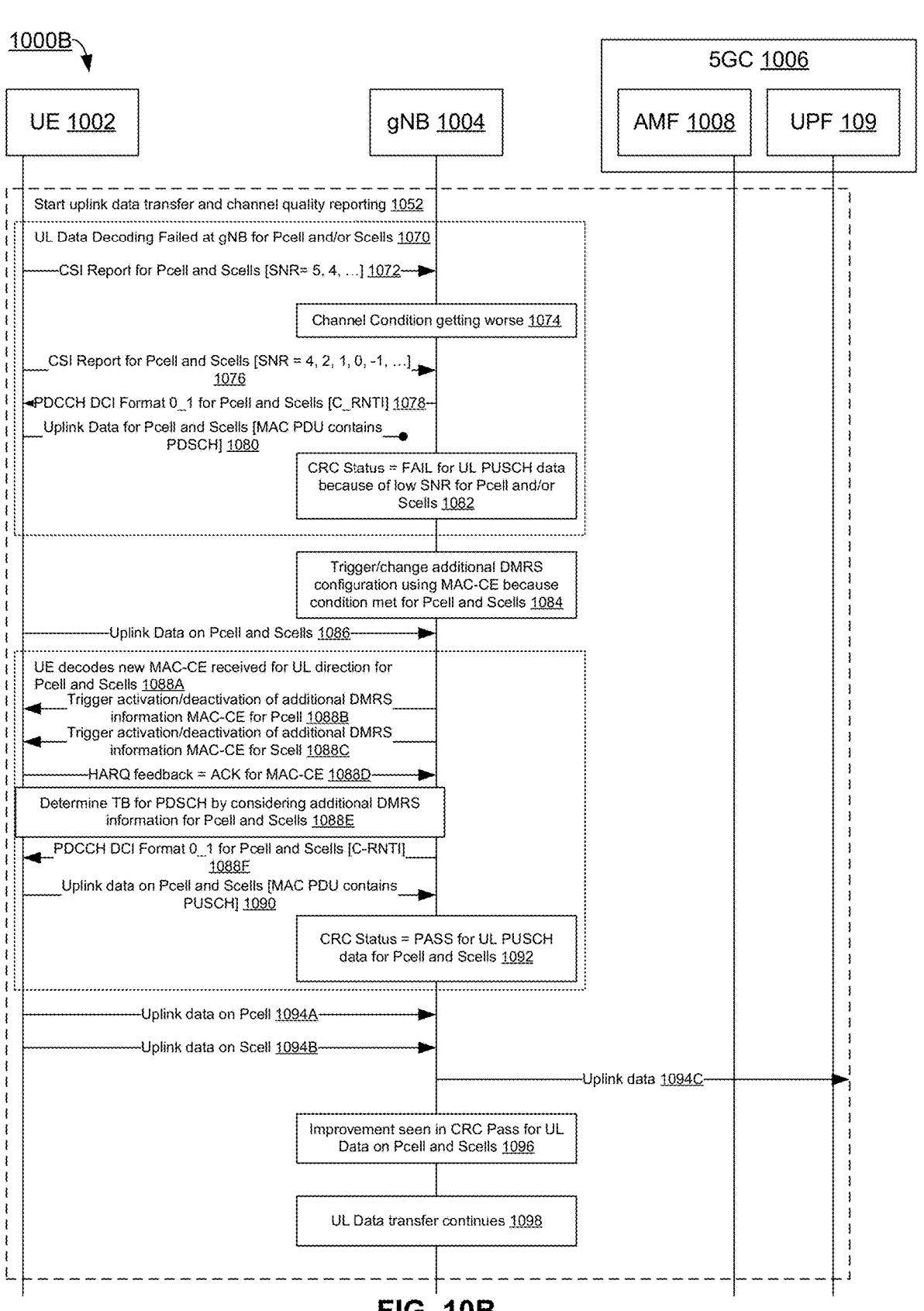

FIGS. 10A and 10B illustrate an example signal flow for dynamic additional DMRS configuration for a uplink, and that can facilitate dynamic additional DMRS configuration in accordance with an embodiment of this disclosure.

As depicted, in signal flow 1000, communications are sent between user equipment 1002, gNB 1004, and 5GC 1006 (which comprises AMF 1008 and UPF 1010).

The signal flow of signal flow 1000 is an example signal flow, and there can be signal flows that implement different signals, or the signals of signal flow 1000 in a different order, as part of facilitating dynamic additional DMRS configuration.

As depicted in signal flow 1000, the following occurs:

5G-NR RRC connection setup 1012

Msg1: Preamble 1014

Allocate temporary C-RNTI 1016

PDCCH DCI Format 1_0 [RA_RNTI] 1018

Msg2: Random Access Response 1020

Msg3: RRCSetupRequest 1022

PDCCH DCI Format 1_0 [C_RNTI] 1024

Msg4: RRCSetup 1026, where a dynamicAddition-alDmrsSupport[TRUE/FALSE] IE is contained in this message, and can be added as part of the present techniques PDCCH DCI Format 0_0 [C_RNTI] 1028

RRCSetupComplete 1030

AMF Selection 1032

Initial UE message [NAS-PDU: Registration Request] 1034

NAS Identity Request/Response 1036

NAS Authentication Request/Response 1038

NAS Security Mode Command/Complete 1040

UE capability enquiry 1041A

UE capability information, with dynamicAddition-alDmrsSupport[Supported] IE in FeatureSetUplink 1041B (or dynamicAdditionalDmrsSupport[Supported] IE in FeatureSetDownlink for downlink)

Initial Context Setup Request [NAS-PDU: Registration Accept] 1042

RRCReconfiguration with dynamicAdditionalDmrsSupport=TRUE in PDSCH-Config IE where UE supports this feature in uplink 1044

RRCReconfigurationComplete 1046

Initial Context Setup Response 1048

SA UE attach procedure completed 1050

Uplink secondary cells activation procedure 1051A

Condition met to activate secondary cells 1051B

Trigger Scell activation MAC-CE 1051C

PDCCH DCI format 0_1 for Pcell [C_RNTI] 1051D

PDCCH DCI format 0_1 for Scell [C_RNTI] 1051E

Uplink data on Pcell [MAC PDU contains PUSCH] 1051F

Uplink data on Scell(s) [MAC PDU contains PUSCH] 1051G

Uplink data 1051H

Uplink data 1051I

Start uplink data transfer and channel quality reporting 1052

Uplink data 1054

Uplink data 1056

PDCCH DCI Format 0_1 on Pcell [C_RNTI] 1058A

Uplink Data on Pcell [MAC PDU contains PDSCH] 1058B

PDCCH DCI Format 0_1 on Scell [C_RNTI] 1060A

Uplink Data on Scell [MAC PDU contains PDSCH] 1060B

CRC status=PASS for UL PUSCH data for Pcell and Scell 1062

Uplink data 1064

Uplink data 1066

CSI Report for Pcell and Scells [SNR>=10] 1068

UL data decoding failed at gNB for Pcell and/or Scells 1070

CSI Report for Pcell and Scells [SNR=5, 4, . . . ] 1072

Channel condition getting worse 1074

CSI Report for Pcell and Scells [SNR=4, 2, 1, 0, −1, . . . ] 1076

PDCCH DCI Format 0_1 for Pcell and Scells [C_RNTI] 1078

Uplink Data on Pcell and Scells [MAC PDU contains PUSCH] 1080

CRC Status=FAIL for UL PUSCH because of low SNR for Pcell and/or Scells 1082

Trigger/change additional DMRS configuration in UL DCI because of a condition for Pcell and Scells 1084, where, in some examples, a condition can be UL SNR reporting is bad for a certain threshold and period; UL CRC fails because SNR is low (e.g., BLER is high for a certain threshold and period); UE is on a cell edge; and/or UE is on high mobility Uplink data on Pcell and Scells 1086

UE decodes new MAC-CE received for UL direction for Pcell and Scells 1088A

Trigger activation/deactivation of additional DMRS information MAC-CE for Pcell 1088B (with a MAC-CE according to the present techniques)

Trigger activation/deactivation of additional DMRS information MAC-CE for Scell 1088C (with a MAC-CE according to the present techniques)

HARQ feedback=ACK for MAC-CE 1088D

Determine TB for PDSCH by considering additional DMRS information for Pcell and Scells 1088E

PDCCH DCI Format 0_1 for Pcell and Scells [C_RNTI] 1088F

Uplink data on Pcell and Scells [MAC PDU contains PUSCH] 1090

CRC Status=PASS for UL PUSCH data for Pcell and Scells 1092

Uplink data on Pcell 1094A

Uplink data on Scell 1094B

Uplink data 1094C

Improvement seen in CRC Pass for UL Data on Pcell and Scells 1096

UL Data transfer continues 1098

User equipment 1002, gNB 1004, 5GC 1006, AMF 1008, and UPF 1010 can be similar to user equipment 902, gNB 904, 5GC 906, AMF 908, and UPF 910 of FIGS. 9A and 9B, respectively. Signals 1012-950 can be similar to signals 912-950.

Example Process Flows

FIG. 11 illustrates an example process flow 1100 that can facilitate dynamic additional DMRS configuration, in accordance with an embodiment of this disclosure. In some examples, one or more embodiments of process flow 1100 can be implemented by UE 902 of FIGS. 9A and 9B, UE 1002 of FIGS. 10A and 10B, and/or computing environment 1500 of FIG. 15.

It can be appreciated that the operating procedures of process flow 1100 are example operating procedures, and that there can be embodiments that implement more or fewer operating procedures than are depicted, or that implement the depicted operating procedures in a different order than as depicted. In some examples, process flow 1100 can be implemented in conjunction with one or more embodiments of one or more of process flow 1200 of FIG. 12, and/or process flow 1300 of FIG. 13.

Process flow 1100 begins with 1102, and moves to operation 1104.

Operation 1104 depicts configuring a first number of demodulation reference signal positions in radio resource control information as part of a connection setup with a base station that is configured to facilitate first broadband cellular communications, wherein the first broadband cellular communications are facilitated with carrier aggregation of a primary cell and a secondary cell. This can comprise user equipment (e.g., UE 902 of FIGS. 9A and 9B) establishing a connection setup with a gNB (e.g., gNB 904 of FIGS. 9A and 9B), where the connection setup can be similar to connection setup 912 and/or connection setup 1012. The first number of additional demodulation reference signal positions can be the number that are established as part of an attach procedure.

After operation 1104, process flow 1100 moves to operation 1106.

Operation 1106 depicts, after attaching to the base station, receiving a first medium access control control element message from the base station indicative of modifying the first number of demodulation reference signal positions to a second number of demodulation reference signal positions for the primary cell. In some examples, this message can be similar to trigger activation/deactivation of additional DMRS information MAC-CE for Pcell 985B of FIG. 9B (in a case of downlink communications), and/or trigger activation/deactivation of additional DMRS information MAC-CE for Pcell 1088B of FIG. 10B (in a case of uplink communications). The MAC-CE message can be similar in structure to that depicted with respect to FIGS. 8A and 8B.

In some examples, operation 1106 comprises, in response to receiving the medium access control control element message, sending, to the base station, a hybrid automatic repeat request message that acknowledges the medium access control control element message. In some examples, this hybrid automatic repeat request message can be similar to HARQ feedback=ACK for MAC-CE 985D of FIG. 9B, and/or HARQ Feedback=ACK for MAC-CE 1088D of FIG. 10B.

In some examples, the medium access control control element message indicates triggering activation of demodulation reference signal positions. In some examples, the medium access control control element message indicates triggering deactivation of demodulation reference signal positions. That is, a MAC-CE message can be used for both activating and deactivating additional DRMS positions.

In some examples, operation 1106 comprises, as part of the attaching to the base station, receiving, from the base station, a radio resource control setup message that indicates that the base station supports modification of the first number of demodulation reference signal positions after attaching to the base station. In some examples, this radio resource control setup message can be similar to Msg4: RRCSetup 926, where a dynamicAdditionalDmrsSupport [TRUE/FALSE] IE is contained in this message, and can be added as part of the present techniques of FIG. 9A, and/or Msg4: RRCSetup 1026, where a dynamicAdditionalDmrs-Support[TRUE/FALSE] IE is contained in this message, and can be added as part of the present techniques of FIG. 10A.

In some examples, an information element of the radio resource control setup message indicates that the base station supports the modification of the first number of demodulation reference signal positions after attaching to the base station. That is, within the radio resource control message, a dynamicAdditionalDmrsSupport[TRUE/ FALSE] IE can be contained, which indicates whether the base station supports dynamic modification of demodulation reference signal positions.

In some examples, operation 1106 comprises, before receiving the message from the base station indicative of modifying the first number of demodulation reference signal positions, receiving a radio resource control reconfiguration message that indicates that the base station supports modification of the first number of demodulation reference signal positions after attaching to the base station. This radio resource control reconfiguration message can be similar to RRCReconfiguration with dynamicAdditionalDmrsSupport=TRUE in PDSCH-Config IE where UE supports this feature in downlink 944, and/or RRCReconfiguration with dynamicAdditionalDmrsSupport=TRUE in PUSCH-Config IE where UE supports this feature in uplink 1044.

This radio resource control reconfiguration message can indicate that the UE already supports a dynamic additional DMRS feature that is communicated by the UE in 941B or 1041B as part of UE capability information. Here, a gNB can add this IE in a RRC Reconfiguration message.

In some examples, a physical downlink shared channel configuration information element of the radio resource control reconfiguration message indicates that the base station supports the modification of the first number of demodulation reference signal positions in downlink communications. That is, the IE can be similar to PDSCH-Config IE in RRCReconfiguration with dynamicAdditionalDmrsSupport=TRUE in PDSCH-Config IE where UE supports this feature in downlink 944.

In some examples, a physical uplink shared channel configuration information element of the radio resource control reconfiguration message indicates that the base station supports the modification of the first number of demodulation reference signal positions in uplink communications. That is, the IE can be similar to PUSCH-Config IE in RRCReconfiguration with dynamicAdditionalDmrsSupport=TRUE in PUSCH-Config IE where UE supports this feature in uplink 1044.

In some examples, operation 1106 comprises before receiving the message from the base station indicative of modifying the first number of demodulation reference signal positions, sending, to the base station, a user equipment capability message that indicates support for modification of the first number of demodulation reference signal positions after attaching to the base station. In some examples, this user equipment capability message can be similar to UE capability information, with dynamicAdditionalDmrsSupport[Supported] IE in FeatureSetDownlink 941B of FIG. 9A, and/or UE capability information, with dynamicAdditionalDmrsSupport[Supported] IE in FeatureSetUplink 1041B of FIG. 10A.

In some examples, an information element of the user equipment capability message indicates the support for the modification of the first number of demodulation reference signal positions after attaching to the base station. That is, within the user equipment capability message, a dynamicAdditionalDmrsSupport[Supported] IE can be contained, which indicates whether the user equipment supports dynamic modification of demodulation reference signal positions.

After operation 1106, process flow 1100 moves to operation 1108.

Operation 1108 depicts, after attaching to the base station, receiving a second medium access control control element message from the base station indicative of modifying the first number of demodulation reference signal positions to the second number of demodulation reference signal positions for the secondary cell.

In some examples, this can comprise determining that a secondary cell is activated, and can be performed based on determining that downlink secondary cells activation procedure 951A of FIG. 9A or uplink secondary cells activation procedure 1051A of FIG. 10A has been performed.

In some examples, a group of secondary cells that comprises the secondary cell is activated with respect to the user equipment. That is, it can be that multiple Scells are activated.

In some examples, the second medium access control control element message is indicative of modifying the first number of demodulation reference signal positions to the second number of demodulation reference signal positions for each secondary cell of the group of secondary cells. In some examples, each secondary cell of the group of secondary cells is configured to use a same number of demodulation reference signal positions. That is, when Scells are configured for additional DMRS signal positions, they can all be configured in the same way (among the Scells that have additional DMRS signal positions enabled).

In some examples, the group of secondary cells comprises a first subgroup of secondary cells for which additional demodulation reference signal positions are enabled, and a second subgroup of secondary cells for which the additional demodulation reference signal positions are not enabled, and the second medium access control control element message is indicative of modifying the first number of demodulation reference signal positions to the second number of demodulation reference signal positions for each secondary cell of the first subgroup of secondary cells, and further indicative of an absence of modifying the first number of demodulation reference signal positions to the second number of demodulation reference signal positions for each secondary cell of the second subgroup of secondary cells. That is, there can be some Scells for which additional DMRS signal positions are enabled (e.g., the first subgroup of secondary cells), and some Scells for which additional DMRS signal positions are not enabled (e.g., the second subgroup of secondary cells). In such examples, it can be that the number of additional DMRS signal positions are modified for the first subgroup of secondary cells, and not modified for the second subgroup of secondary cells.

In some examples, operation 1108 comprises configuring the second medium access control control element message according to a first format in response to a number of secondary cells in a group of secondary cells that comprises the secondary cell being determined to be less than or equal to a criterion threshold applicable to secondary cells, or configuring the second medium access control control element message according to a second format in response to the number of secondary cells in the group of secondary cells that comprises the secondary cell being determined to be greater than the criterion threshold. In some examples, the criterion threshold is a first criterion threshold, and wherein configuring the second medium access control control element message according to the second format is performed in response to the number of secondary cells being determined to be less than or equal to a second criterion threshold.

That is, different types of MAC-CE messages can be sent based on a number of Scells that are activated. Using the example of FIGS. 8A and 8B, MAC-CE message 810 can be used when the number of Scells that are activated is up to 7, and MAC-CE message 830 can be used when the number of Scells that are activated ranges between 8-31, inclusive.

It can be appreciated that there can be examples where the different types of MAC-CE messages are used for different number of activated Scells than 1-7 and 8-31.

After operation 1108, process flow 1100 moves to operation 1110.

Operation 1110 depicts conducting second broadband cellular communications with the base station according to the second number of demodulation reference signal positions, wherein a throughput of the second broadband cellular communications is determined as a function of a size of a transport block set based on the second number of demodulation reference signal positions. This can comprise the user equipment using the dynamically configured additional DMRS positions, such as in DL data transfer continues 996 of FIG. 9B (in a case of downlink communications), and/or UL data transfer continues 1098 of FIG. 10B (in a case of uplink communications).

After operation 1110, process flow 1100 moves to 1112, where process flow 1100 ends.

FIG. 12 illustrates an example process flow 1200 that can facilitate dynamic additional DMRS configuration, in accordance with an embodiment of this disclosure. In some examples, one or more embodiments of process flow 1200 can be implemented by UE 902 of FIGS. 9A and 9B, UE 1002 of FIGS. 10A and 10B, and/or computing environment 1500 of FIG. 15.

It can be appreciated that the operating procedures of process flow 1200 are example operating procedures, and that there can be embodiments that implement more or fewer operating procedures than are depicted, or that implement the depicted operating procedures in a different order than as depicted. In some examples, process flow 1200 can be implemented in conjunction with one or more embodiments of one or more of process flow 1100 of FIG. 11, and/or process flow 1300 of FIG. 13.

Process flow 1200 begins with 1202, and moves to operation 1204.

Operation 1204 depicts, after attaching to a base station that is configured to facilitate broadband cellular communications, receiving, by a system comprising a processor, a first medium access control control element message from the base station indicative of a first number of demodulation reference signal positions that was established as part of a connection setup being modified to a second number of demodulation reference signal positions with respect to a primary cell, wherein the broadband cellular communications are facilitated with carrier aggregation of the primary cell and a secondary cell. In some examples, operation 1204 can be implemented in a similar manner as operations 1104-1106 of FIG. 11.

In some examples, the second number of demodulation reference signal positions is configured for uplink communications of the broadband cellular communications, and wherein the receiving the message from the base station is performed in response to sending uplink data to the base station. That is, the additional DMRS positions can be changed for uplink communications, and determining to change the additional DMRS positions can be made based on uplink data.

In some examples, the uplink data indicates that an uplink signal-to-noise ratio metric does not satisfy a threshold associated with a predetermined quality criterion for a defined amount of time, wherein a cyclic redundancy check that corresponds to the uplink data has failed or is failing, wherein the uplink data indicates that the system is connected to edge network equipment of a cellular network via which the broadband cellular communications are conducted, or wherein the uplink data indicates that the system satisfies a defined physical movement criterion.

After operation 1204, process flow 1200 moves to operation 1206.

Operation 1206 depicts receiving, by the system, a second medium access control control element message from the base station indicative of the first number of demodulation reference signal positions being modified to the second number of demodulation reference signal positions with respect to the secondary cell. In some examples, operation 1206 can be implemented in a similar manner as operation 1108 of FIG. 11.

After operation 1206, process flow 1200 moves to operation 1208.

Operation 1208 depicts conducting, by the system, broadband cellular communications with the base station according to the second number of demodulation reference signal positions. In some examples, operation 1208 can be implemented in a similar manner as operation 1110 of FIG. 11.

After operation 1208, process flow 1200 moves to 1210, where process flow 1200 ends.

FIG. 13 illustrates an example process flow 1300 that can facilitate dynamic additional DMRS configuration, in accordance with an embodiment of this disclosure. In some examples, one or more embodiments of process flow 1300 can be implemented by UE 902 of FIGS. 9A and 9B, UE 1002 of FIGS. 10A and 10B, and/or computing environment 1500 of FIG. 15.

It can be appreciated that the operating procedures of process flow 1300 are example operating procedures, and that there can be embodiments that implement more or fewer operating procedures than are depicted, or that implement the depicted operating procedures in a different order than as depicted. In some examples, process flow 1300 can be implemented in conjunction with one or more embodiments of one or more of process flow 1100 of FIG. 11, and/or process flow 1200 of FIG. 12.

Process flow 1300 begins with 1302, and moves to operation 1304. Operation 1304 depicts, after attaching to base station equipment that is configured to facilitate broadband cellular communications, receiving a first medium access control control element message from the base station equipment indicative of a modified number of demodulation reference signal positions that was established as part of a connection setup with respect to a primary cell, wherein the broadband cellular communications are facilitated with carrier aggregation of the primary cell and a secondary cell. In some examples, operation 1204 can be implemented in a similar manner as operations 1104-1106 of FIG. 11.

In some examples, modifying the number of demodulation reference signal positions is performed for downlink communications of the broadband cellular communications, and wherein the receiving the first medium access control control element message from the base station equipment is performed in response to sending hybrid automatic feedback that indicates failure or a channel quality indicator reporting metric to the base station equipment. That is, the additional DMRS positions can be changed for downlink communications, and determining to change the additional DMRS positions can be made based on downlink data.

In some examples, the modified number of demodulation reference signal positions is configured for uplink communications of the broadband cellular communications, and the receiving the first medium access control control element message from the base station equipment is performed in response to sending uplink data to the base station equipment. That is, where a number of additional DMRS positions is changed for uplink communications, a determination to change the number of additional DMRS positions can be made based on uplink data.

In some examples, the channel quality indicator reporting metric does not satisfy a threshold associated with a defined threshold criterion for a defined amount of time. That is, CQI reporting can be bad for a defined threshold value and time period.

In some examples, the hybrid automatic feedback is being reported as a negative acknowledgement. That is, HARQ feedback can be reported as NACK.

In some examples, the hybrid automatic feedback is being reported as the negative acknowledgement based on a block error rate metric satisfying a threshold associated with a defined threshold criterion for a defined amount of time, that there is a connection to edge network equipment of a cellular network via which the first broadband cellular communications are conducted, or that a defined high mobility criterion is satisfied. That is, BLER can be high for a defined threshold value and time period; the UE can be located on cell edge; or the UE can be on high mobility.

In some examples, operation 1304 comprises, before receiving the first medium access control control element message from the base station equipment indicative of the modified number of demodulation reference signal positions, receiving a radio resource control reconfiguration message that indicates that the base station equipment supports modification of demodulation reference signal positions after attaching to the base station. That is, a message of RRCReconfiguration with dynamicAdditionalDmrsSupport=TRUE can be received in either a PDSCH-Config IE or a PUSCH-Config IE.

After operation 1304, process flow 1300 moves to operation 1306.

Operation 1306 depicts receiving a second medium access control control element message from the base station equipment indicative of the modified number of demodulation reference signal positions with respect to the secondary cell. In some examples, operation 1306 can be implemented in a similar manner as operation 1108 of FIG. 11.

After operation 1306, process flow 1300 moves to operation 1308.

Operation 1308 depicts conducting broadband cellular communications with the base station equipment according to the modified number of demodulation reference signal positions. In some examples, operation 1308 can be implemented in a similar manner as operation 1108 of FIG. 11.

In some examples, the broadband cellular communications are second broadband cellular communications, modifying the number of demodulation reference signal positions comprises modifying the number of demodulation reference signal positions from a first number of demodulation reference signal positions to a second number of demodulation reference signal positions, and a second throughput of the second broadband cellular communications is less than a first throughput of a first broadband cellular communication that is conducted according to the first number of demodulation reference signal positions. That is, data throughput can be inversely proportional to a number of configured additional DMRS positions, where a larger number of additional DMRS symbols indicates a smaller data throughput.

After operation 1308, process flow 1300 moves to 1310, where process flow 1300 ends.

Example Architecture

Figure 14:
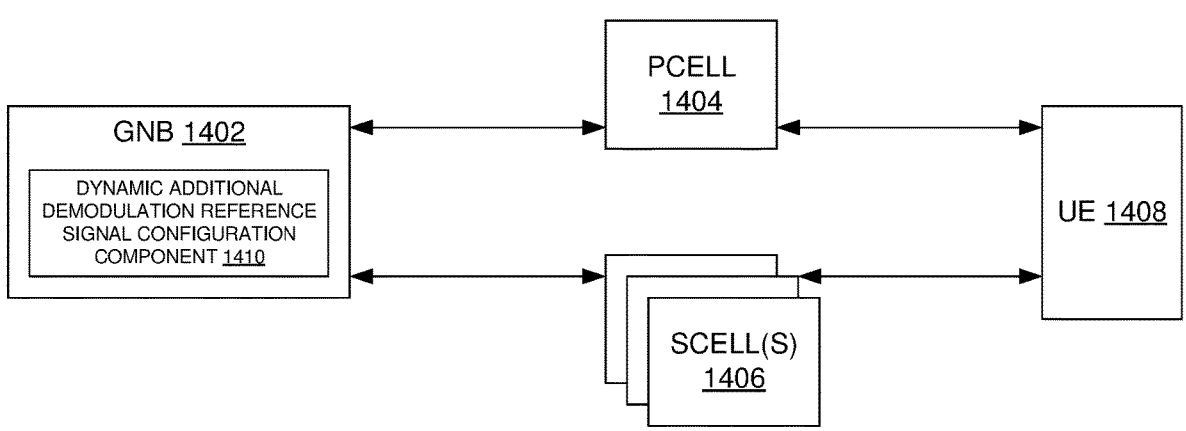
FIG. 14 illustrates an example system architecture that can facilitate dynamic additional DMRS configuration in accordance with an embodiment of this disclosure.

FIG. 14 illustrates an example system architecture 1400 that can facilitate dynamic additional DMRS configuration in accordance with an embodiment of this disclosure. In some examples, part(s) of system architecture can be used to implement the signal flows of FIGS. 9A, 9B, 10A, 10B, and/or the process flows of FIGS. 11-13.

As depicted, system architecture 1400 comprises gNB 1402, Pcell 1404, Scell(s) 1406, UE 1408, and dynamic additional demodulation reference signal configuration component 1410. In some examples, gNB 1402 can be similar to gNB 702 of FIG. 7, and UE 1408 can be similar to UE 704. Pcell 1404 can be a Pcell as described herein, and that is communicatively coupled to both gNB 1402 and UE 1408. Similarly, Scell(s) 1406 can be one or more Scells as described herein, and that are communicatively coupled to both gNB 1402 and UE 1408.

Dynamic additional demodulation reference signal configuration component 1410 can comprise a component of gNB 1402 that facilitates dynamic additional demodulation reference signal configuration as described herein, and can do so in a scenario where carrier aggregation of Pcell 1404 and Scell(s) 1406 is enabled.

Example Operating Environment

Figure 15:
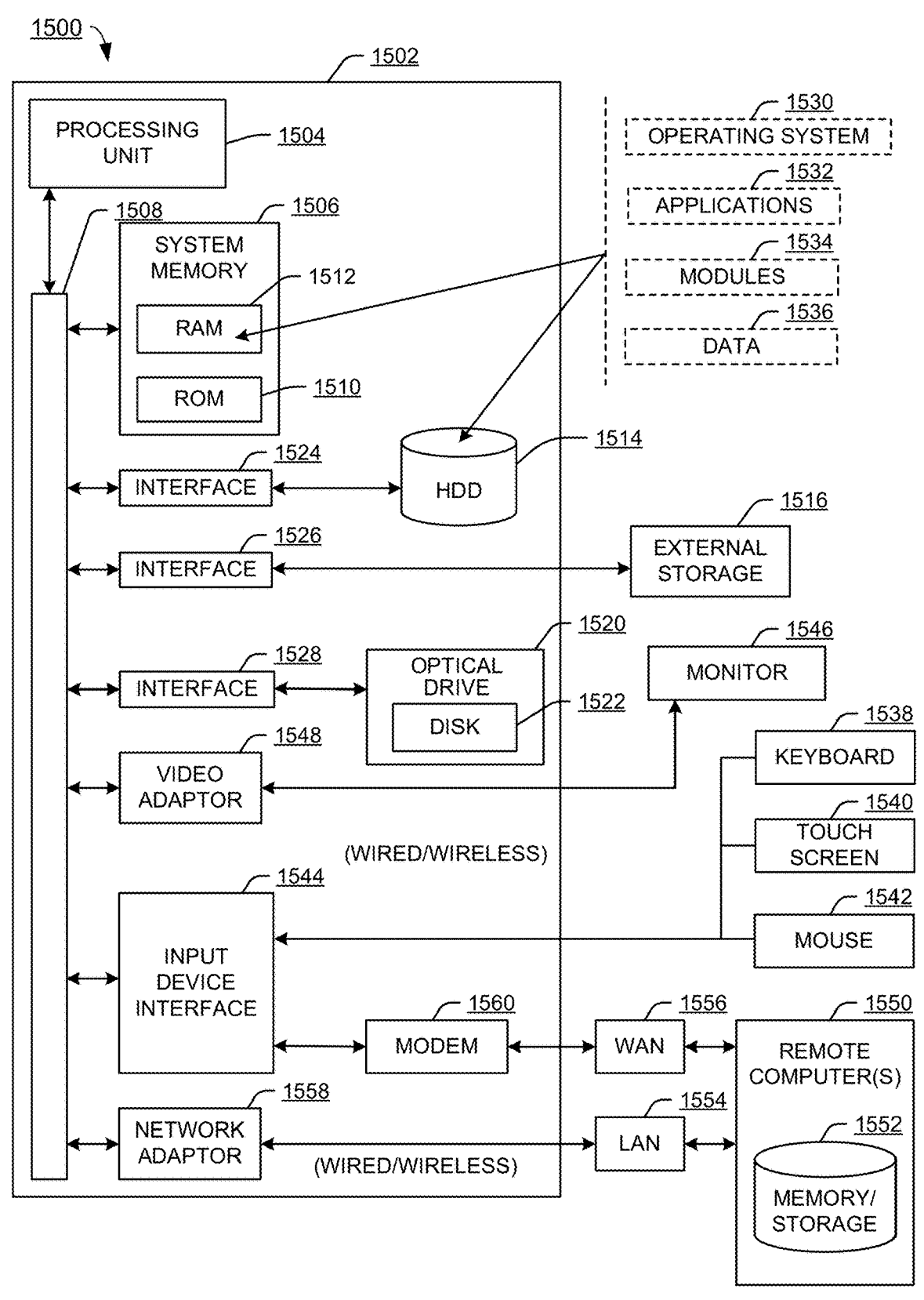
FIG. 15 illustrates an example block diagram of a computer operable to execute an embodiment of this disclosure.

In order to provide additional context for various embodiments described herein, FIG. 15 and the following discussion are intended to provide a brief, general description of a suitable computing environment 1500 in which the various embodiments of the embodiment described herein can be implemented.

For example, parts of computing environment 1500 can be used to implement one or more embodiments of dynamic additional DMRS configuration component 310 of FIGS. 3A and 3B; dynamic additional DMRS configuration component 410 of FIGS. 4A and 4B; dynamic additional DMRS configuration component 510 of FIGS. 5A and 5B; dynamic additional DMRS configuration component 610 of FIGS. 6A and 6B; gNB 702 and/or UE 704 of FIG. 7; UE 902, gNB 904, and/or 5GC 906 of FIGS. 9A and 9B; and/or UE 1002, gNB 1004, and/or 5GC 1006 of FIGS. 10A and 10B.

In some examples, computing environment 1500 can implement one or more embodiments of the process flows of FIGS. 11-13 to facilitate dynamic additional DMRS configuration.

While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which are used herein differently from one another as follows. Computer-readable storage media or machine-readable storage media can be any available storage media that can be accessed by the computer and include both volatile and nonvolatile media, and removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 15, the example environment 1500 for implementing various embodiments described herein includes a computer 1502, the computer 1502 including a processing unit 1504, a system memory 1506 and a system bus 1508. The system bus 1508 couples system components including, but not limited to, the system memory 1506 to the processing unit 1504. The processing unit 1504 can be any of various commercially available processors. Dual microprocessors and other multi-processor architectures can also be employed as the processing unit 1504.

The system bus 1508 can be any of several types of bus structure that can further interconnect to a memory bus (with or without a memory controller), a peripheral bus, and a local bus using any of a variety of commercially available bus architectures. The system memory 1506 includes ROM 1510 and RAM 1512. A basic input/output system (BIOS) can be stored in a nonvolatile storage such as ROM, erasable programmable read only memory (EPROM), EEPROM, which BIOS contains the basic routines that help to transfer information between elements within the computer 1502, such as during startup. The RAM 1512 can also include a high-speed RAM such as static RAM for caching data.

The computer 1502 further includes an internal hard disk drive (HDD) 1514 (e.g., EIDE, SATA), one or more external storage devices 1516 (e.g., a magnetic floppy disk drive (FDD) 1516, a memory stick or flash drive reader, a memory card reader, etc.) and an optical disk drive 1520 (e.g., which can read or write from a CD-ROM disc, a DVD, a BD, etc.). While the internal HDD 1514 is illustrated as located within the computer 1502, the internal HDD 1514 can also be configured for external use in a suitable chassis (not shown). Additionally, while not shown in environment 1500, a solid state drive (SSD) could be used in addition to, or in place of, an HDD 1514. The HDD 1514, external storage device(s) 1516 and optical disk drive 1520 can be connected to the system bus 1508 by an HDD interface 1524, an external storage interface 1526 and an optical drive interface 1528, respectively. The interface 1524 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1502, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1512, including an operating system 1530, one or more application programs 1532, other program modules 1534 and program data 1536. All or portions of the operating system, applications, modules, and/or data can also be cached in the RAM 1512. The systems and methods described herein can be implemented utilizing various commercially available operating systems or combinations of operating systems.

Computer 1502 can optionally comprise emulation technologies. For example, a hypervisor (not shown) or other intermediary can emulate a hardware environment for operating system 1530, and the emulated hardware can optionally be different from the hardware illustrated in FIG. 15. In such an embodiment, operating system 1530 can comprise one virtual machine (VM) of multiple VMs hosted at computer 1502. Furthermore, operating system 1530 can provide runtime environments, such as the Java runtime environment or the .NET framework, for applications 1532. Runtime environments are consistent execution environments that allow applications 1532 to run on any operating system that includes the runtime environment. Similarly, operating system 1530 can support containers, and applications 1532 can be in the form of containers, which are lightweight, standalone, executable packages of software that include, e.g., code, runtime, system tools, system libraries and settings for an application.

Further, computer 1502 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1502, e.g., applied at the application execution level or at the operating system (OS) kernel level, thereby enabling security at any level of code execution.

A user can enter commands and information into the computer 1502 through one or more wired/wireless input devices, e.g., a keyboard 1538, a touch screen 1540, and a pointing device, such as a mouse 1542. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1504 through an input device interface 1544 that can be coupled to the system bus 1508, but can be connected by other interfaces, such as a parallel port, an IEEE 1594 serial port, a game port, a USB port, an IR interface, a BLUETOOTH® interface, etc.

A monitor 1546 or other type of display device can be also connected to the system bus 1508 via an interface, such as a video adapter 1548. In addition to the monitor 1546, a computer typically includes other peripheral output devices (not shown), such as speakers, printers, etc.

The computer 1502 can operate in a networked environment using logical connections via wired and/or wireless communications to one or more remote computers, such as a remote computer(s) 1550. The remote computer(s) 1550 can be a workstation, a server computer, a router, a personal computer, portable computer, microprocessor-based entertainment appliance, a peer device or other common network node, and typically includes many or all of the elements described relative to the computer 1502, although, for purposes of brevity, only a memory/storage device 1552 is illustrated. The logical connections depicted include wired/wireless connectivity to a local area network (LAN) 1554 and/or larger networks, e.g., a wide area network (WAN) 1556. Such LAN and WAN networking environments are commonplace in offices and companies, and facilitate enterprise-wide computer networks, such as intranets, all of which can connect to a global communications network, e.g., the Internet.

When used in a LAN networking environment, the computer 1502 can be connected to the local network 1554 through a wired and/or wireless communication network interface or adapter 1558. The adapter 1558 can facilitate wired or wireless communication to the LAN 1554, which can also include a wireless access point (AP) disposed thereon for communicating with the adapter 1558 in a wireless mode.

When used in a WAN networking environment, the computer 1502 can include a modem 1560 or can be connected to a communications server on the WAN 1556 via other means for establishing communications over the WAN 1556, such as by way of the Internet. The modem 1560, which can be internal or external and a wired or wireless device, can be connected to the system bus 1508 via the input device interface 1544. In a networked environment, program modules depicted relative to the computer 1502 or portions thereof, can be stored in the remote memory/storage device 1552. It will be appreciated that the network connections shown are examples, and other means of establishing a communications link between the computers can be used.

When used in either a LAN or WAN networking environment, the computer 1502 can access cloud storage systems or other network-based storage systems in addition to, or in place of, external storage devices 1516 as described above. Generally, a connection between the computer 1502 and a cloud storage system can be established over a LAN 1554 or WAN 1556 e.g., by the adapter 1558 or modem 1560, respectively. Upon connecting the computer 1502 to an associated cloud storage system, the external storage interface 1526 can, with the aid of the adapter 1558 and/or modem 1560, manage storage provided by the cloud storage system as it would other types of external storage. For instance, the external storage interface 1526 can be configured to provide access to cloud storage sources as if those sources were physically connected to the computer 1502.

The computer 1502 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

CONCLUSION

As it is employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. For instance, when a processor executes instructions to perform "operations", this could include the processor performing the operations directly and/or facilitating, directing, or cooperating with another device or component to perform the operations.

In the subject specification, terms such as "datastore," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile storage, or can include both volatile and nonvolatile storage. By way of illustration, and not limitation, nonvolatile storage can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SL-DRAM), and direct Rambus RAM (DRRAM). Additionally, the disclosed memory components of systems or methods herein are intended to comprise, without being limited to comprising, these and any other suitable types of memory.

The illustrated embodiments of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or application programming interface (API) components.

Further, the various embodiments can be implemented as a method, apparatus, or article of manufacture using standard programming and/or engineering techniques to produce software, firmware, hardware, or any combination thereof to control a computer to implement one or more embodiments of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any embodiment or design described herein as "exemplary" is not necessarily to be construed as preferred or advantageous over other embodiments or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
at least one processor; and
at least one memory coupled to the at least one processor, comprising instructions that cause the processor to perform operations comprising:
configuring a first number of demodulation reference signal positions in radio resource control information as part of a connection setup with a base station that is configured to facilitate first broadband cellular communications, wherein the first broadband cellular communications are facilitated with carrier aggregation of a primary cell and a secondary cell;
after attaching to the base station, receiving a first medium access control control element message from the base station indicative of modifying the first number of demodulation reference signal positions to a second number of demodulation reference signal positions for the primary cell;
after attaching to the base station, receiving a second medium access control control element message from the base station indicative of modifying the first number of demodulation reference signal positions to the second number of demodulation reference signal positions for the secondary cell, wherein a group of secondary cells that comprises the secondary cell is activated with respect to the system, wherein the group of secondary cells comprises a first subgroup of secondary cells for which additional demodulation reference signal positions are enabled, and a second subgroup of secondary cells for which the additional demodulation reference signal positions are not enabled, and wherein the second medium access control control element message is indicative of modifying the first number of demodulation reference signal positions to the second number of demodulation reference signal positions for each secondary cell of the first subgroup of secondary cells, and further indicative of an absence of modifying the first number of demodulation reference signal positions to the second number of demodulation reference signal positions for each secondary cell of the second subgroup of secondary cells; and
conducting second broadband cellular communications with the base station according to the second number of demodulation reference signal positions, wherein a throughput of the second broadband cellular communications is determined as a function of a size of a transport block set based on the second number of demodulation reference signal positions.

2. The system of claim 1, wherein the second medium access control control element message is configured according to a first format in response to a number of secondary cells in the group of secondary cells that comprises the secondary cell being determined to be less than or equal to a criterion threshold applicable to secondary cells.

3. The system of claim 2, wherein the second medium access control control element message is configured according to a second format in response to the number of secondary cells in the group of secondary cells that comprises the secondary cell being determined to be greater than the criterion threshold.

4. The system of claim 3, wherein the criterion threshold is a first criterion threshold, and wherein configuring the second medium access control control element message according to the second format is performed in response to the number of secondary cells being determined to be less than or equal to a second criterion threshold.

5. The system of claim 1, wherein the operations further comprise:
as part of the attaching to the base station, receiving, from the base station, a radio resource control setup message that indicates that the base station supports modification of the first number of demodulation reference signal positions after attaching to the base station.

6. The system of claim 1, wherein the operations further comprise:
before receiving the first medium access control control element message from the base station indicative of modifying the first number of demodulation reference signal positions, sending, to the base station, a user equipment capability message that indicates support for modification of the first number of demodulation reference signal positions after attaching to the base station.

7. A method, comprising:
after attaching to a base station that is configured to facilitate broadband cellular communications, receiving, by a system comprising at least one processor, a first medium access control control element message from the base station indicative of a first number of demodulation reference signal positions that was established as part of a connection setup being modified to a second number of demodulation reference signal positions with respect to a primary cell, wherein the broadband cellular communications are facilitated with carrier aggregation of the primary cell, a first group of at least one secondary cells, and a second group of at least one secondary cells;

receiving, by the system, a second medium access control control element message from the base station indicative of the first number of demodulation reference signal positions being modified to the second number of demodulation reference signal positions with respect to the first group of at least one secondary cells, and wherein the second medium access control control element message is further indicative of an absence of modifying the first number of demodulation reference signal positions to the second number of demodulation reference signal positions for the second group of at least one secondary cells; and conducting, by the system, the broadband cellular communications with the base station according to the second number of demodulation reference signal positions.

8. The method of claim 7, further comprising:

in response to receiving the first medium access control control element message, sending, by the system and to the base station, a hybrid automatic repeat request message that acknowledges the first medium access control control element message.

9. The method of claim 7, wherein the first medium access control control element message indicates triggering activation of demodulation reference signal positions.

10. The method of claim 7, wherein the first medium access control control element message indicates triggering deactivation of demodulation reference signal positions.

11. The method of claim 7, further comprising:

as part of the attaching to the base station, receiving, by the system and from the base station, a radio resource control setup message that indicates that the base station supports modification of the first number of demodulation reference signal positions after attaching to the base station.

12. The method of claim 7, further comprising:

before receiving the first medium access control control element message from the base station indicative of modifying the first number of demodulation reference signal positions, sending, by the system and to the base station, a user equipment capability message that indicates support for modification of the first number of demodulation reference signal positions after attaching to the base station.

13. A non-transitory computer-readable medium comprising instructions that, in response to execution, cause a system comprising at least one processor to perform operations, comprising:

after attaching to base station equipment that is configured to facilitate broadband cellular communications, receiving a first medium access control control element message from the base station equipment indicative of a modified number of demodulation reference signal positions that was established as part of a connection setup with respect to a primary cell, wherein the broadband cellular communications are facilitated with carrier aggregation of the primary cell, a first group of at least one secondary cells, and a second group of at least one secondary cells;

receiving a second medium access control control element message from the base station equipment indicative of the modified number of demodulation reference signal positions with respect to the first group of at least one secondary cells, and wherein the second medium access control control element message is further indicative of an absence of modifying the first number of demodulation reference signal positions to the second number of demodulation reference signal positions for the second group of at least one secondary cells; and conducting the broadband cellular communications with the base station equipment according to the modified number of demodulation reference signal positions.

14. The non-transitory computer-readable medium of claim 13, wherein the operations further comprise:

before receiving the first medium access control control element message from the base station equipment indicative of the modified number of demodulation reference signal positions, receiving a radio resource control reconfiguration message that indicates that the base station equipment supports modification of demodulation reference signal positions after attaching to the base station.

15. The non-transitory computer-readable medium of claim 13, wherein the modified number of demodulation reference signal positions is configured for uplink communications of the broadband cellular communications, and wherein the receiving the first medium access control control element message from the base station equipment is performed in response to sending uplink data to the base station equipment.

16. The non-transitory computer-readable medium of claim 15, wherein the uplink data indicates that an uplink signal-to-noise ratio metric does not satisfy a threshold associated with a predetermined quality criterion for a defined amount of time, wherein a cyclic redundancy check that corresponds to the uplink data has failed or is failing, wherein the uplink data indicates that the system is connected to edge network equipment of a cellular network via which the broadband cellular communications are conducted, or wherein the uplink data indicates that the system satisfies a defined physical movement criterion.

17. The non-transitory computer-readable medium of claim 13, wherein the modified number of demodulation reference signal positions is applicable for downlink communications of the broadband cellular communications, and wherein the receiving the first medium access control control element message from the base station equipment is performed in response to sending hybrid automatic feedback that indicates failure or a channel quality indicator reporting metric to the base station equipment.

18. The non-transitory computer-readable medium of claim 17, wherein the channel quality indicator reporting metric does not satisfy a threshold associated with a defined threshold criterion for a defined amount of time.

19. The non-transitory computer-readable medium of claim 13, wherein the operations further comprise:

as part of the attaching to the base station equipment, receiving, from the base station, a radio resource control setup message that indicates that the base station supports modification of the first number of demodulation reference signal positions after attaching to the base station equipment.

20. The non-transitory computer-readable medium of claim 19, wherein a first value of the a radio resource control setup message indicates that the base station supports modification of the first number of demodulation reference signal positions after attaching to the base station equipment, and wherein the radio resource control setup message is configured to comprise a second value that indicates that the system is not able to support modification of the first number of additional demodulation reference signal positions after the attaching to the system.

* * * * *